(12) United States Patent
Brown

(10) Patent No.: US 7,793,747 B2
(45) Date of Patent: Sep. 14, 2010

(54) TOURING MOTORCYCLE MODIFICATION KIT

(76) Inventor: Peter L. Brown, 20 Woodland Rise, Calgary, Alberta (CA) T3R 1G9

(*) Notice: Subject to any disclaimer, the term of this patent is extended or adjusted under 35 U.S.C. 154(b) by 610 days.

(21) Appl. No.: 11/625,627

(22) Filed: Jan. 22, 2007

(65) Prior Publication Data

US 2008/0174099 A1 Jul. 24, 2008

(51) Int. Cl.
*B62K 11/02* (2006.01)

(52) U.S. Cl. .................. 180/219; 280/854; 224/423

(58) Field of Classification Search .............. 180/219; 280/854, 152.1, 152.2–152.3; 224/423, 412, 224/413; 293/105
See application file for complete search history.

(56) References Cited

U.S. PATENT DOCUMENTS

| | | | |
|---|---|---|---|
| 2,636,652 A * | 4/1953 | Foringer | 224/413 |
| 3,795,354 A * | 3/1974 | Stippich | 224/418 |
| 5,025,883 A * | 6/1991 | Morinaka et al. | 180/219 |
| 5,107,949 A * | 4/1992 | Gotoh et al. | 180/219 |
| 6,053,384 A | 4/2000 | Bachman | |
| 6,073,948 A | 6/2000 | Motojima et al. | |
| 6,234,266 B1 * | 5/2001 | Saiki | 180/219 |
| 6,257,362 B1 | 7/2001 | Scherbarth | |
| 6,349,783 B1 | 2/2002 | Galbraith et al. | |
| 6,378,643 B1 | 4/2002 | Galbraith et al. | |
| 6,520,275 B2 | 2/2003 | Galbraith et al. | |
| 6,585,072 B2 | 7/2003 | Scherbarth | |
| 6,840,344 B2 | 1/2005 | Galbraith et al. | |
| 7,036,837 B1 | 5/2006 | Bauer et al. | |
| 7,073,618 B1 * | 7/2006 | Song | 180/219 |
| 7,234,559 B2 * | 6/2007 | Nakano et al. | 180/219 |
| 7,275,787 B1 * | 10/2007 | Grove | 297/215.12 |
| 7,278,560 B2 * | 10/2007 | Aron | 224/413 |
| 2001/0027888 A1 | 10/2001 | Scherbarth | |
| 2002/0029917 A1 | 3/2002 | Galbraith et al. | |
| 2003/0010555 A1 | 1/2003 | Galbraith et al. | |
| 2006/0278456 A1 * | 12/2006 | Desrosiers | 180/219 |

* cited by examiner

*Primary Examiner*—Lesley D Morris
*Assistant Examiner*—Maurice Williams
(74) *Attorney, Agent, or Firm*—Antoinette M. Tease

(57) ABSTRACT

A touring motorcycle modification kit comprising: an internal frame, an external frame, and a fender; wherein the fender is situated between the internal and external frames; wherein the internal frame is situated inside of the fender; wherein the internal frame comprises two portions, and wherein the two portions are bolted together; wherein the external frame is mounted on the fender at three frame mounting points; wherein two of the three frame mounting points are located on the exterior of the fender; wherein none of the three frame mounting points is located inside of the fender; wherein the external frame does not bolt to the frame mounting points but is releasably attached to the three frame mounting points; and wherein no tools are required to install or remove the external frame. The present invention can be used with a factory seat, exhaust system, wiring harness, saddle bags and tour pack.

7 Claims, 26 Drawing Sheets

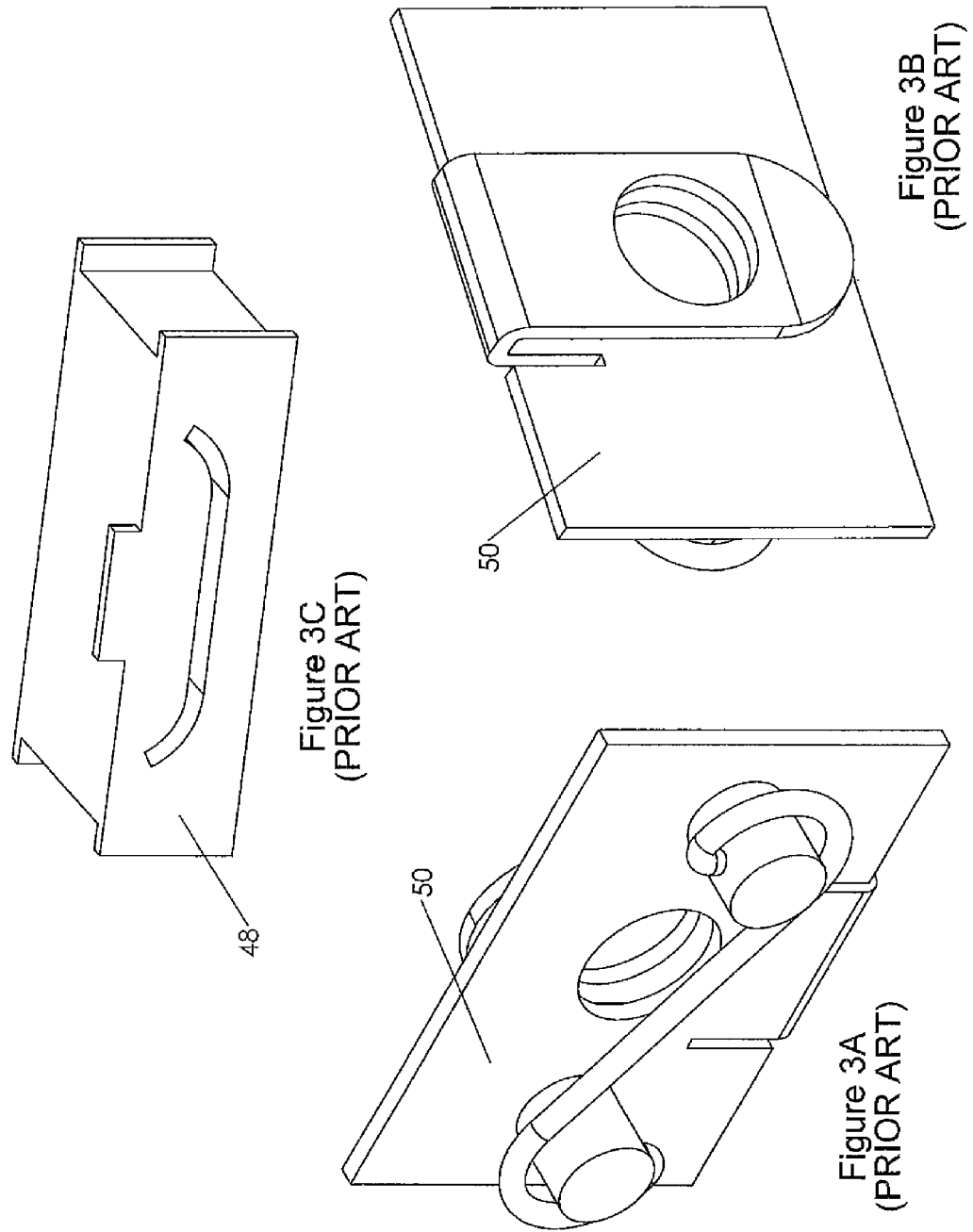

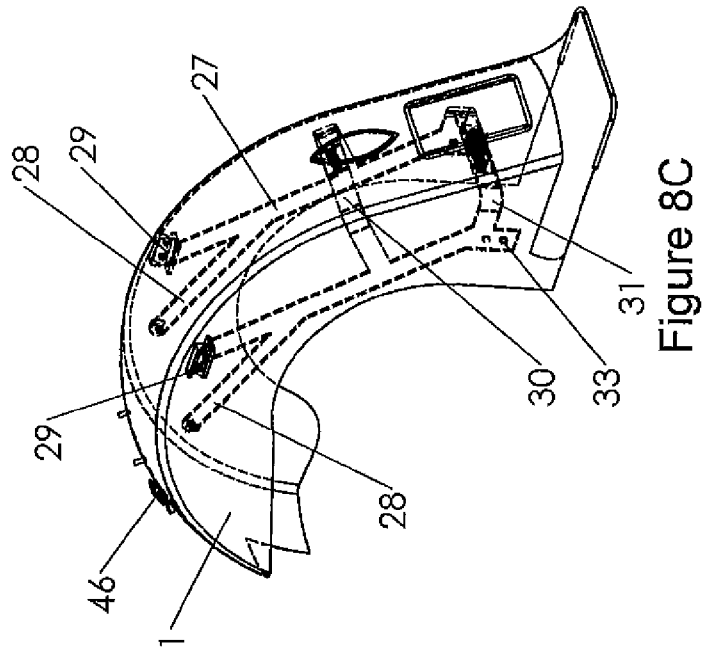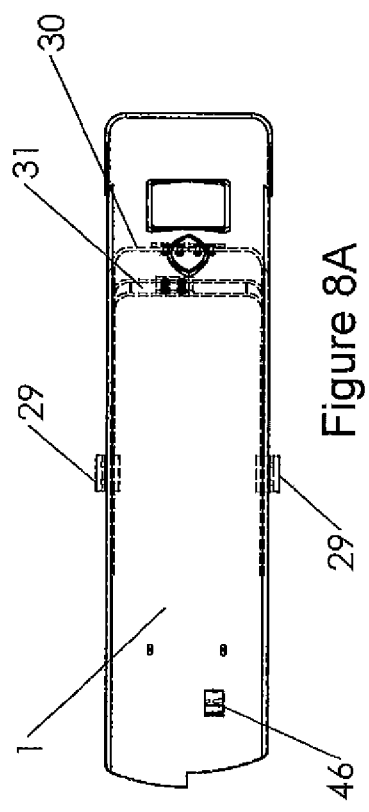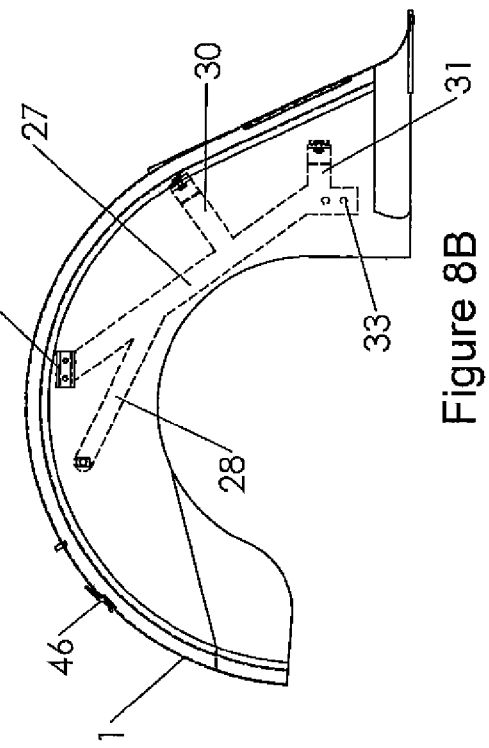

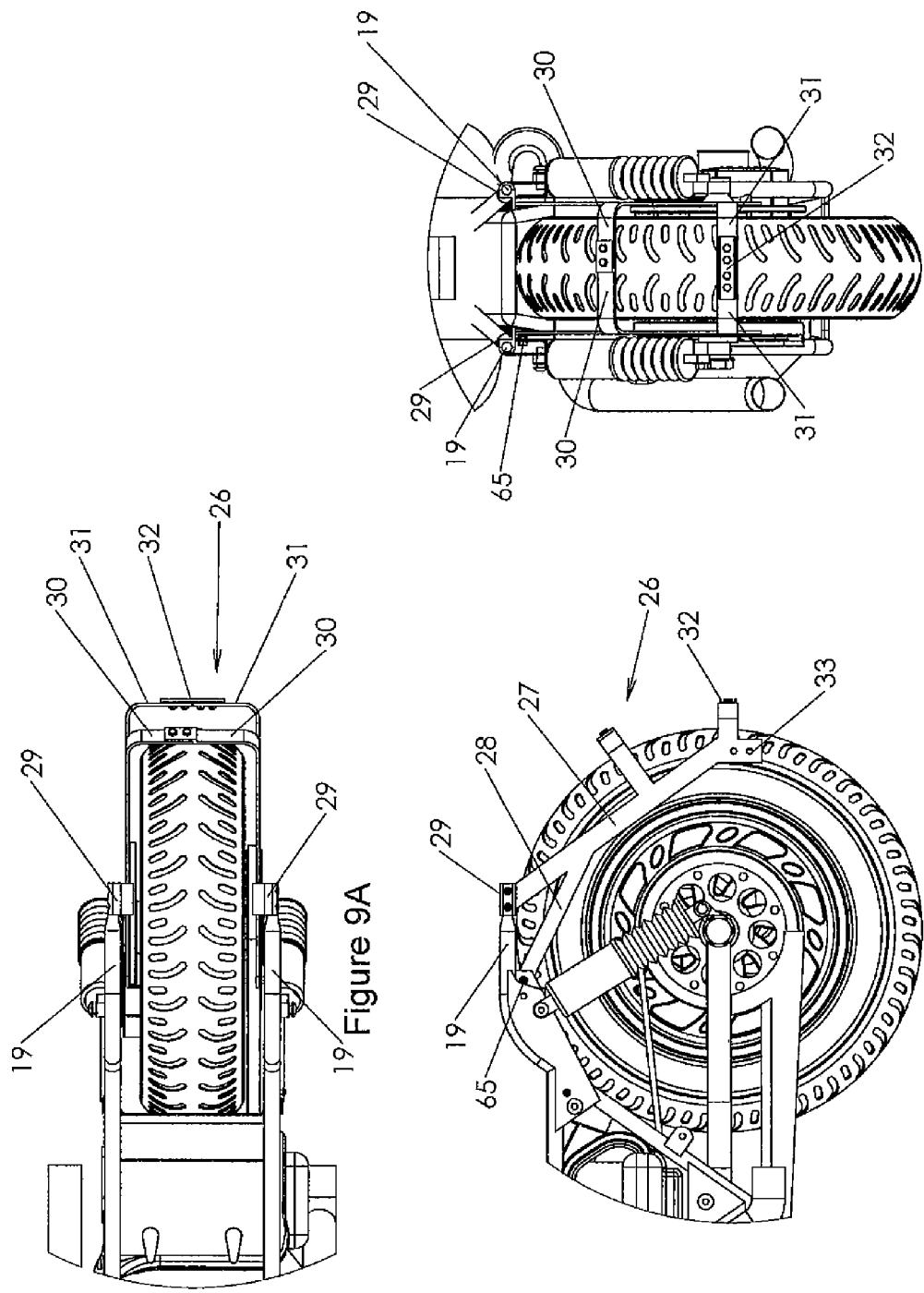

TOURING MOTORCYCLE MODIFICATION KIT

BACKGROUND OF THE INVENTION

1. Field of the Invention

The present invention relates generally to the field of motorcycles, and more particularly, to a touring motorcycle modification kit that enables riders to add or remove saddle bags and/or a tour pack from a Harley-Davidson touring motorcycle while preserving the aesthetics of the motorcycle.

2. Description of the Related Art

The custom motorcycle marketplace has seen enormous growth over the past several years, fueled by a number of conditions. These conditions include: (i) the existence of an affluent "baby boomer" generation interested in acquiring youthful toys (like motorcycles) in an effort to stave off advancing years; (ii) glorification of the "steel horse" and "independent cowboy" images; and (iii) genuine enthusiasm for motorcycle riding in 40- to 70-year-olds who are in a financial position to purchase high-end motorcycles.

The recent phenomenon of television programs such as "American Chopper," "Motorcycle Mania" and "V-Twin Television" has given the motorcycle industry an acceptance by the mainstream public that it had not enjoyed previously. These shows have demystified the motorcycle image and shown the public that not all motorcycle owners are "bad boys" or rebels. It has thus become more socially acceptable for a conservative businessman to own and ride a Harley Davidson motorcycle, further contributing to the demand for custom motorcycles.

As a result of society's increasing acceptance of motorcycles and the aura associated with them, custom motorcycle builders and parts manufacturers who in the past had been able to build respectable businesses based on technical and sales prowess or a racing career are now faced with the opportunity of marketing to a worldwide audience. Many of the signature names in the custom motorcycle business have seen their businesses explode with growth over the past several years. For that reason, many of them have recently moved from single-location, light-industrial welding and fabrication shops to large, multi-location operations with car-dealership-like store-front sales operations.

Harley-Davidson, Inc. in particular has benefited from this industry transition. The name "Harley-Davidson" is one of the most widely recognized trademarks in North America, and Harley-Davidson motorcycles are revered by motorcycle enthusiasts as the grassroots American motorcycle. Since its near demise in the early 1980s, Harley-Davidson has enjoyed steady growth and financial success despite the fact that the custom motorcycle industry siphons off an enormous amount of sales of both custom parts and complete motorcycles. Rather than feeling threatened by these custom builders, Harley-Davidson has chosen to endorse their efforts, realizing that the remarkable strength of their brand affords them a secure position in the industry.

The present invention is an after-market modification kit for use with Harley-Davidson touring motorcycles. A touring motorcycle is generally defined as a motorcycle that comes with saddle bags and/or a tour pack and is built to sustain heavy loads for longer periods of time than non-touring motorcycles. Accessories like saddle bags and tour packs provide greater storage, but they detract from the overall sleek look of the vehicle. The problem that currently exists is that many customers are generally drawn to the chopper or "street-fighter" styles of custom motorcycles, but these styles lack any storage capacity and are not practical for long trips. Motorcycle owners generally place a high premium on the appearance of their motorcycles, and when the saddle bags and tour packs are removed from factory motorcycles, the frames and brackets are exposed. Thus, if the desire is to own both a motorcycle with practical storage capacity and a motorcycle that looks good, a person today must purchase two different motorcycles.

It is an object of the present invention to solve this dilemma by offering a modification kit that allows the rider to remove the saddle bags and/or tour pack without exposing any unsightly frame or brackets. It is a further object of the present invention to provide a modification kit that allows the rider to change from a touring style motorcycle to a chopper style motorcycle, or vice versa, in less than a minute—and without using any tools. Yet another object of the present invention is to provide a modification kit that allows the motorcycle owner to use the factory saddle bags, tour pack, exhaust system, seat, and tail and signal lights.

Although a number of motorcycle improvements and/or retrofit kits have been patented or are patent pending, none of these inventions addresses the problem that is solved by the present invention, namely, providing both a sleek chopper look and the load-carrying capacity of a touring motorcycle in the same vehicle, and enabling the rider to convert from one type of motorcycle to the other without the use of any tools.

U.S. Pat. No. 6,073,948 (Motojima et al.) relates to a rear fender mounting structure designed to facilitate the process of mounting the rear fender to the motorcycle. This invention was also intended to allow a second rider to hold onto the backrest supporting brackets while the motorcycle is running without feeling the vibrations from the engine. This is accomplished by connecting the backrest supporting brackets to the grab rails rather than to the frame members of the sides of the motorcycle body.

U.S. Pat. No. 6,053,384 (Bachman, 2000) provides a system for removably mounting a saddle bag on the fender strut of a motorcycle. This particular invention does not solve the problem of the motorcycle frame and saddle bag mounting brackets being exposed when the saddle bags are removed.

U.S. Pat. No. 6,257,362 (Scherbarth, 2001) and U.S. Pat. No. 6,585,072 (Scherbarth, 2003) and U.S. patent application Pub. No. 2001/0027888 (Scherbarth, 2001) disclose a motorcycle fender mounting system that is designed to conceal the bolts that connect the front fender to the front fork of the motorcycle or the rear fender to the tail section of the motorcycle and also to provide an improved tail light wire routing system whereby the wires do not get dirty as a result of being located along the underside of the rear fender. In that regard, the inner support and the fender define a wire path in which tail light wires can be routed, thereby protecting the wires.

U.S. Pat. No. 6,349,783 (Galbraith et al., 2002) and U.S. Pat. No. 6,378,643 (Galbraith et al., 2002) and U.S. patent application Pub. No. 2002/0029917 (Galbraith et al., 2002) describe another saddle bag mounting system. This invention was intended to eliminate the need for external saddle bag mounting fasteners on the rear fender and corresponding tail section of the motorcycle; however, by locating the mounting points for the saddle bag frame inside the fender, this invention is impractical and requires tools to install the saddle bag frame. In addition, due to the structural design of this invention, only lighter weight saddle bags that do not require support from beneath can be used. This particular invention is not applicable to the Harley-Davidson touring motorcycles, which are designed to support both tour packs and heavier saddle bags.

U.S. Pat. No. 6,520,275 (Galbraith et al., 2003) and U.S. patent application Pub. No. 2003/0010555 (Galbraith et al., 2003) provide yet another saddle bag mounting system. As with the previous invention, and unlike the present invention, this system is designed to allow saddle bags to be installed on a motorcycle that does not otherwise come with saddle bags. With this invention, the external frame or assembly to which the saddle bags are mounted is bolted to an internal frame that sits underneath the fender. In the present invention, by contrast, the external and internal frames are not bolted together, thereby allowing the external frame to be quickly and easily removed. Furthermore, in this invention, a portion of the internal frame is visible when the saddle bags are not installed, whereas the internal frame of the present invention is not visible (with or without saddle bags).

U.S. Pat. No. 6,840,344 (Galbraith et al., 2005) relates to a luggage rack and backrest mounting system for a motorcycle. The backrest mounting portion of the system includes a concave recess on at least one side for snugly receiving a rounded side surface of a backrest assembly. The recess provides support to the backrest assembly such that vertical loads encountered during normal operation are carried by the snug engagement of the concave recess and the rounded side surface, thereby reducing stress on the fasteners used to couple the backrest to the mounting member.

U.S. Pat. No. 7,036,837 (Bauer et al., 2006) discloses a rear frame mounting system for a motorcycle in which the rear fender is mounted to the motorcycle frame while keeping the mounting hardware concealed but readily accessible. This patent does not involve installing or removing saddle bags and/or tour packs.

BRIEF SUMMARY OF THE INVENTION

The present invention is a touring motorcycle modification kit comprising: an internal frame; an external frame; and a fender; wherein the fender is situated between the internal and external frames; wherein the internal frame is situated inside of the fender; wherein the internal frame comprises two portions, and wherein the two portions are bolted together; wherein the external frame is mounted on the motorcycle at three frame mounting points; wherein two of the three frame mounting points are located on the exterior of the fender; wherein none of the three frame mounting points is located inside of the fender; wherein the external frame does not bolt to the frame mounting points but is releasably attached to the three frame mounting points; and wherein no tools are required to install or remove the external frame.

In a preferred embodiment, the internal frame of the present invention comprises two frame rail attachment pieces, wherein the fender comprises an aperture on either side of the fender, wherein when the internal frame is installed inside the fender, each frame rail attachment piece protrudes through one of the two apertures in the fender, wherein the motorcycle comprises two frame rails, and wherein the frame rail attachment pieces are bolted to the frame rails of the motorcycle.

In a preferred embodiment, the external frame of the present invention comprises two saddle-bag-only frames, wherein each saddle-bag-only frame comprises a bottom support rung, a mounting extension, a latching mechanism, a plate behind the latching mechanism, two saddle bag mounting points, and a mounting insertion piece, and wherein the mounting extension fits over a first frame mounting point, the plate behind the latching mechanism fits over a second frame mounting point, and the mounting insertion piece fits into a third frame mounting point. In one embodiment, the latching mechanism comprises a latching hoop, a cover, a cover extension, and a rubber stopper, wherein one of the three frame mounting points is a combination shock absorber bolt and frame mounting point, wherein when the external frame is installed, the latching hoop and the cover rotate downward to cover the combination shock absorber bolt and second frame mounting point, and wherein the rubber stopper is located on the cover extension and prevents the latch from disengaging during operation of the motorcycle when a saddle bag is installed on the motorcycle.

In a preferred embodiment, the present invention further comprises two rear composite fittings, wherein each rear composite fitting is located on either side of the fender, and wherein one of the three frame mounting points is located on top of each rear composite fitting. Preferably, each rear composite fitting comprises an LED signal light and a built-in exhaust hanger.

In a preferred embodiment, the external frame of the present invention comprises two pairs of saddle bag mounting points, wherein each pair of saddle bag mounting points is located on either side of the fender, wherein the saddle bag mounting points are located in the same position as on a factory motorcycle, and wherein saddle bags can be installed using the saddle bag mounting points. Preferably, the present invention further comprises a latching mechanism, wherein the three frame mounting points comprise a first frame mounting point, a second frame mounting point, and a third frame mounting point, wherein the latching mechanism is located directly in front of the second frame mounting point, wherein the saddle bags may be locked, and wherein the latching mechanism prevents the external frame from being removed when the saddle bags are installed on the motorcycle and locked.

In a preferred embodiment, the external frame of the present invention comprises a bottom support rung, a mounting extension, a latching mechanism, a plate behind the latching mechanism, two saddle bag mounting points, and a mounting insertion piece on either side of the fender, wherein each mounting extension fits over a first frame mounting point, each plate behind the latching mechanism fits over a second frame mounting point, and each mounting insertion piece fits into a third frame mounting point, wherein the external frame further comprises a luggage rack, wherein the luggage rack is located on top of the fender, and wherein a tour pack can be attached to the luggage rack. Optionally, the present invention further comprises a sissy bar, wherein the sissy bar is attached to the front end of the luggage rack and extends vertically from the luggage rack.

In a preferred embodiment, the present invention further comprises two strut covers, wherein a frame mounting point is located in an indentation in the strut cover, and wherein the frame mounting point is a combination shock absorber bolt and frame mounting point.

In a preferred embodiment, the present invention further comprises two side covers, wherein each side cover comprises a rear edge, and wherein a frame mounting point is located adjacent to the rear edge of each side cover.

In a preferred embodiment, the internal frame of the present invention comprises a right-hand portion and a left-hand portion, wherein each portion comprises a main support arm, an attachment arm, a first cross-member, and a second cross-member, wherein each main support arm comprises a frame rail attachment piece and a rear composite fitting attachment point, wherein the frame rail attachment piece is located at a first end of the main support arm and the rear composite fitting attachment point is located at a second end of the main support arm, wherein the first cross-member of one portion of the internal frame is bolted to the first cross-member of the other portion of the internal frame, and wherein the second cross-member of one portion of the internal frame is bolted to the second cross-member of the other portion of the internal frame or to a cross-member attachment piece that connects the second cross-members of each portion to each other. Preferably, each portion of the internal frame of the modification kit is attached to the motorcycle frame at three points, wherein two of the attachment points are located on the frame rail attachment piece, and wherein the third attachment point is located on the attachment arm.

In a preferred embodiment, the present invention can be used with a factory seat, exhaust system, wiring harness, saddle bags and tour pack.

BRIEF DESCRIPTION OF THE DRAWINGS

FIGS. 3A and 3B are detail views of the saddle bag clips (prior art) that are taken from the factory motorcycle and reused in the present invention.

FIG. 3C is a detail view of the rubber exhaust hanger grommet (prior art) that is taken from the factory motorcycle and reused in the present invention.

FIG. 8A is a top view of the internal frame of the present invention as it would appear mounted inside of the fender prior to installation on the motorcycle.

FIG. 8B is a side view of the internal frame of the present invention as it would appear mounted inside of the fender prior to installation on the motorcycle.

FIG. 8C is a perspective view of the internal frame of the present invention as it would appear mounted inside of the fender prior to installation on the motorcycle.

FIG. 9A is a top view of the internal frame of the present invention mounted onto the frame rails of the motorcycle.

FIG. 9B is a side view of the internal frame of the present invention mounted onto the frame rails of the motorcycle.

FIG. 9C is a rear view of the internal frame of the present invention mounted onto the frame rails of the motorcycle.

REFERENCE NUMBERS

Figure 1:
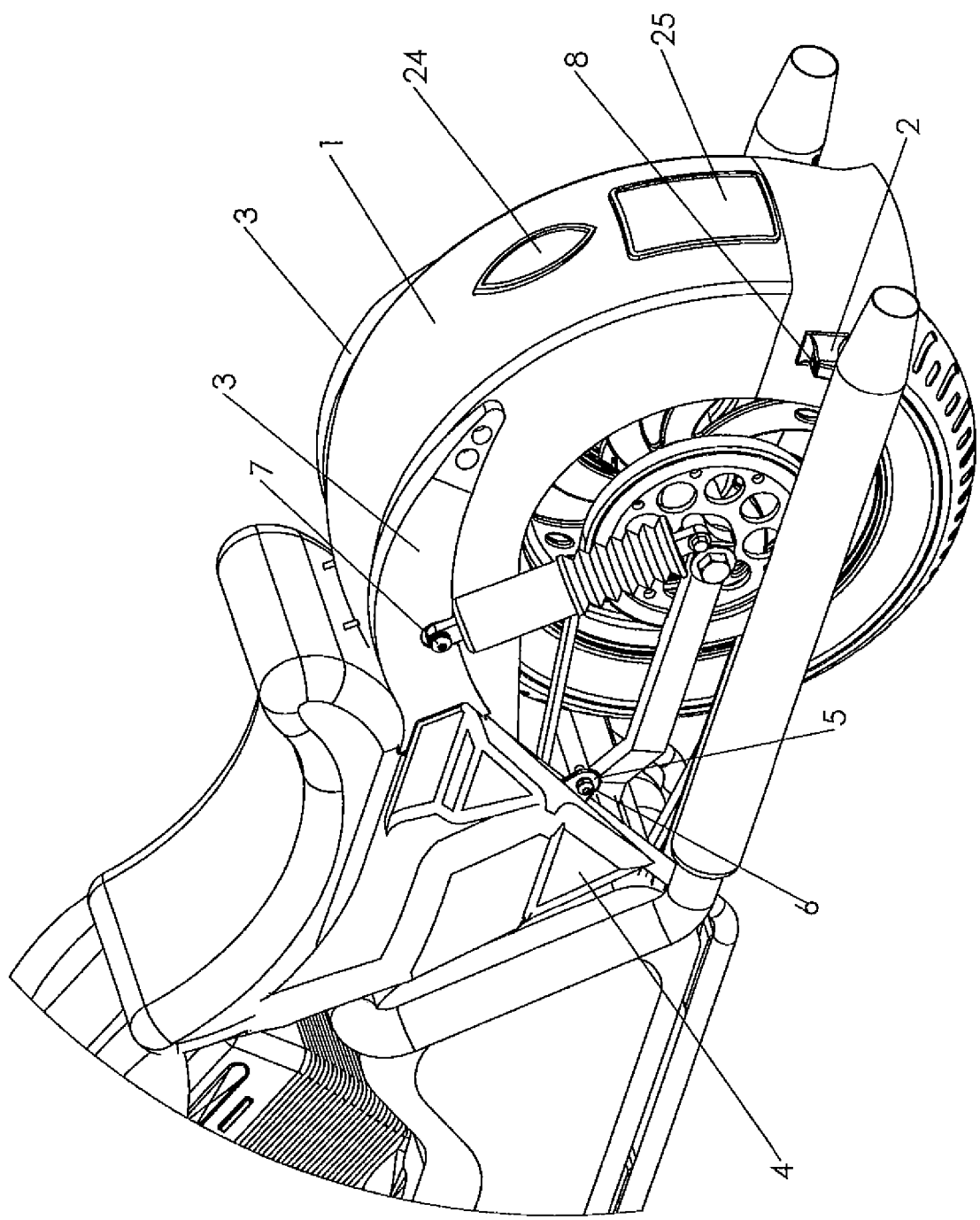
FIG. 1 is a perspective view of one embodiment of the present invention without the saddle bags and saddle-bag-only or tour pack/luggage frame installed.

1 Fender
2 Rear composite fitting
3 Strut cover
4 Side cover
5 Chrome frame tab cover
6 First frame mounting point
7 Second frame mounting point
8 Third frame mounting point
9 Saddle bag frame (prior art)
10 Mounting bracket for the saddle bag frame (prior art)
11 Saddle bag mounting point (prior art)
12 Seat (prior art)
13 Muffler (prior art)
14 Side cover (prior art)
15 Strut cover (prior art)
16 Rear structural member (prior art)
17 Luggage rack or tour pack mounting frame (prior art)
18 Fender (prior art)
19 Frame rail (prior art)
20 Frame tab (prior art)
21 Shock absorber bolt (prior art)
22 Tail light (prior art)
23 Signal light (prior art)
24 Tail light
25 License plate holder
26 Internal frame
27 Main support arm
28 Attachment arm
29 Frame rail attachment piece
30 First cross-member
31 Second cross-member
32 Cross-member attachment piece
33 Rear composite fitting attachment point
34 Indentation (on strut cover)
35 First aperture (on fender)
36 Second aperture (on fender)

37 Saddle-bag-only frame
37a Seat attachment point
38 Bottom support rung
39 Mounting extension
40 Latching mechanism
41 Recess (in plate behind latching mechanism)
42 Saddle bag mounting point
43 Mounting insertion piece
44 Plate (behind latching mechanism)
45 Gap (of first and second frame mounting points)
46 Wiring harness (prior art)
47 Built-in exhaust hanger
48 Rubber exhaust hanger grommet (prior art)
49 LED signal light
50 Saddle bag clip (prior art)
51 Saddle bag (prior art)
52 Tour pack/luggage frame
53 Tour pack (prior art)
54 Backrest (prior art)
55 Luggage rack
56 Sissy bar
57 Latching hoop
58 Latch cover
59 Latch cover extension
60 Rubber stopper
61 Shock absorber
62 Exhaust hanger (prior art)
63 Tip (of attachment arm)
64 Saddle bag lock
65 Factory fender mounting fitting
66 Padded backrest
67 Slat (on luggage rack)

DETAILED DESCRIPTION OF INVENTION

FIG. 1 is a perspective view of one embodiment of the present invention without the saddle bags and saddle-bag-only or tour pack/luggage frame installed. This figure shows the fender 1, one of the two rear composite fittings 2 that attach to the internal frame 26 on either side of the fender 1, one of the two strut covers 3, one of two side covers 4, and the chrome frame tab cover 5 (which covers the frame tab 20) and first frame mounting point 6. Also shown is the combination shock absorber bolt and second frame mounting point 7. All of these parts, plus a variety of fasteners (not shown), are included in the modification kit of the present invention.

Figure 2:
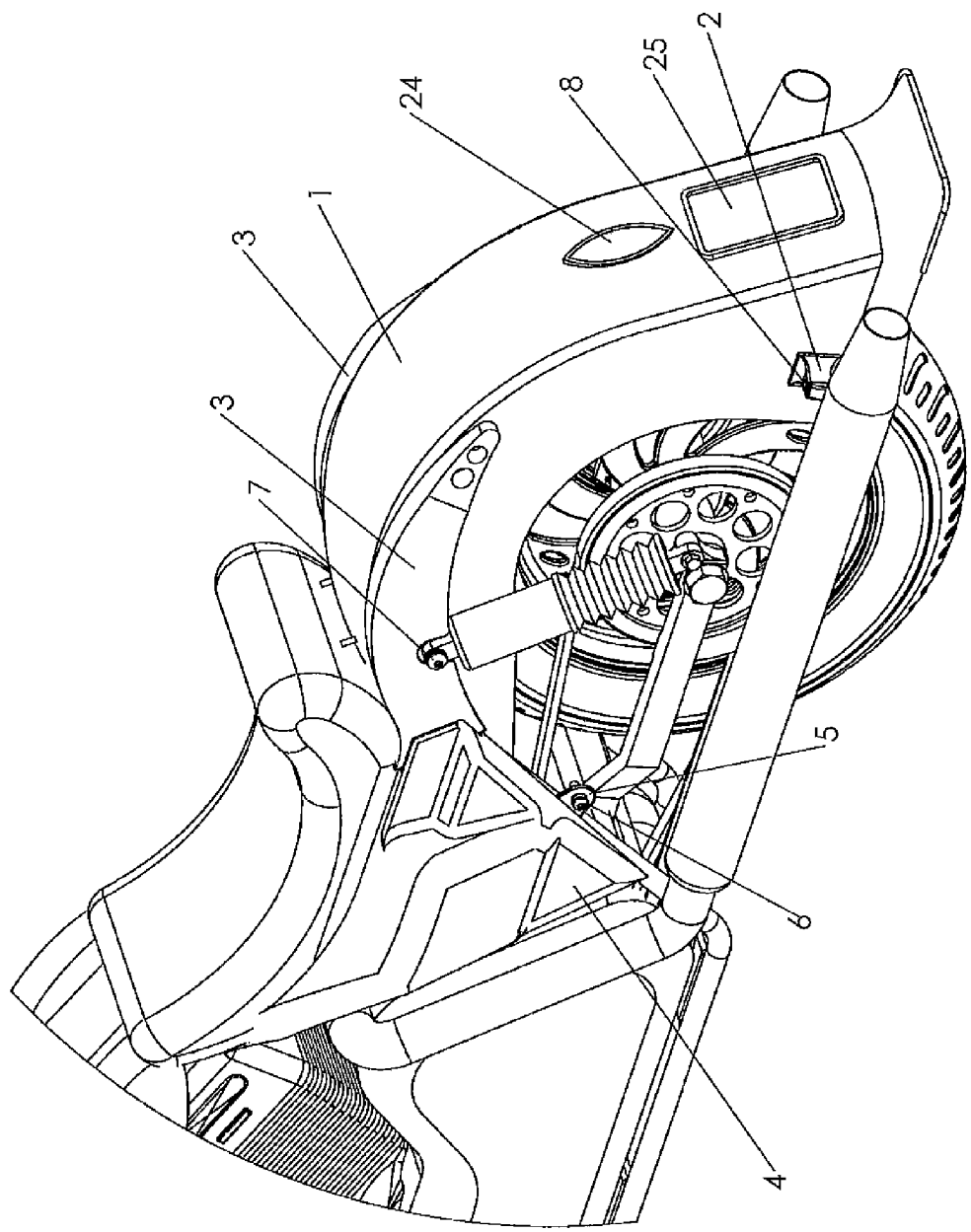
FIG. 2 is a perspective view of another embodiment of the present invention without the saddle bags and saddle-bag-only or tour pack/luggage frame installed.

The fender style shown in this figure is a chopper-style design, but the present invention is not limited to any particular fender style. FIG. 2 depicts an alternate fender style, in which the fender has a more sweeping or nostalgic look. The only limitations in terms of fender style are that the fender has to accommodate and conceal the internal frame (discussed in connection with FIGS. 6-8) and have apertures for attachment of the rear composite fittings 2, frame rail attachment pieces 29, and the factory fender mounting fitting 65. As long as the fender possesses these characteristics, the actual style or appearance of the fender is irrelevant to the present invention. Future designs utilizing this invention will not only provide additional aesthetic styles from which to choose but will also offer various lighting and license plate frame options, including the use of the factory tail and signal lights and license plate frame.

Figure 11:
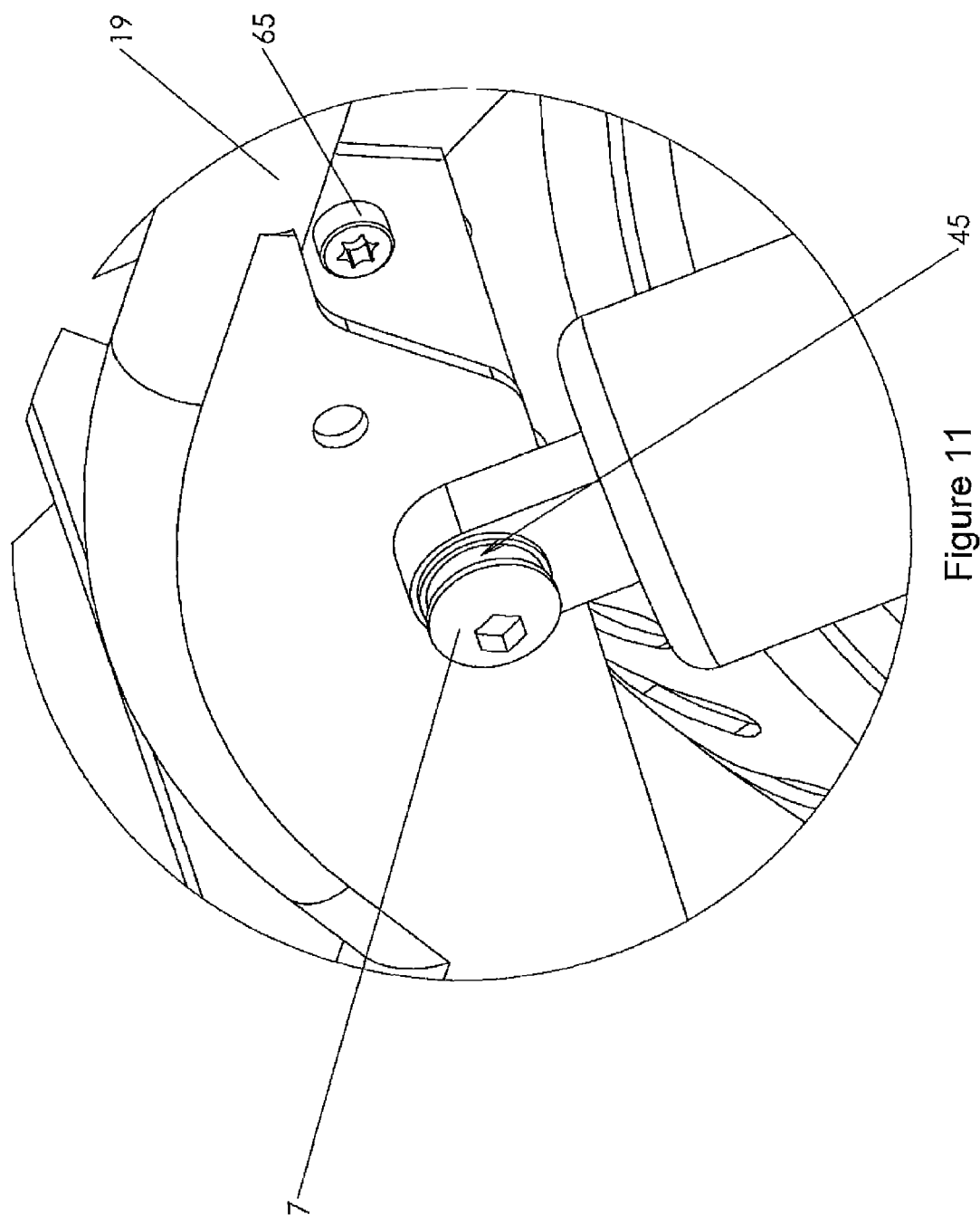
FIG. 11 is a detail view of the second frame mounting point of the present invention.
Figure 12:
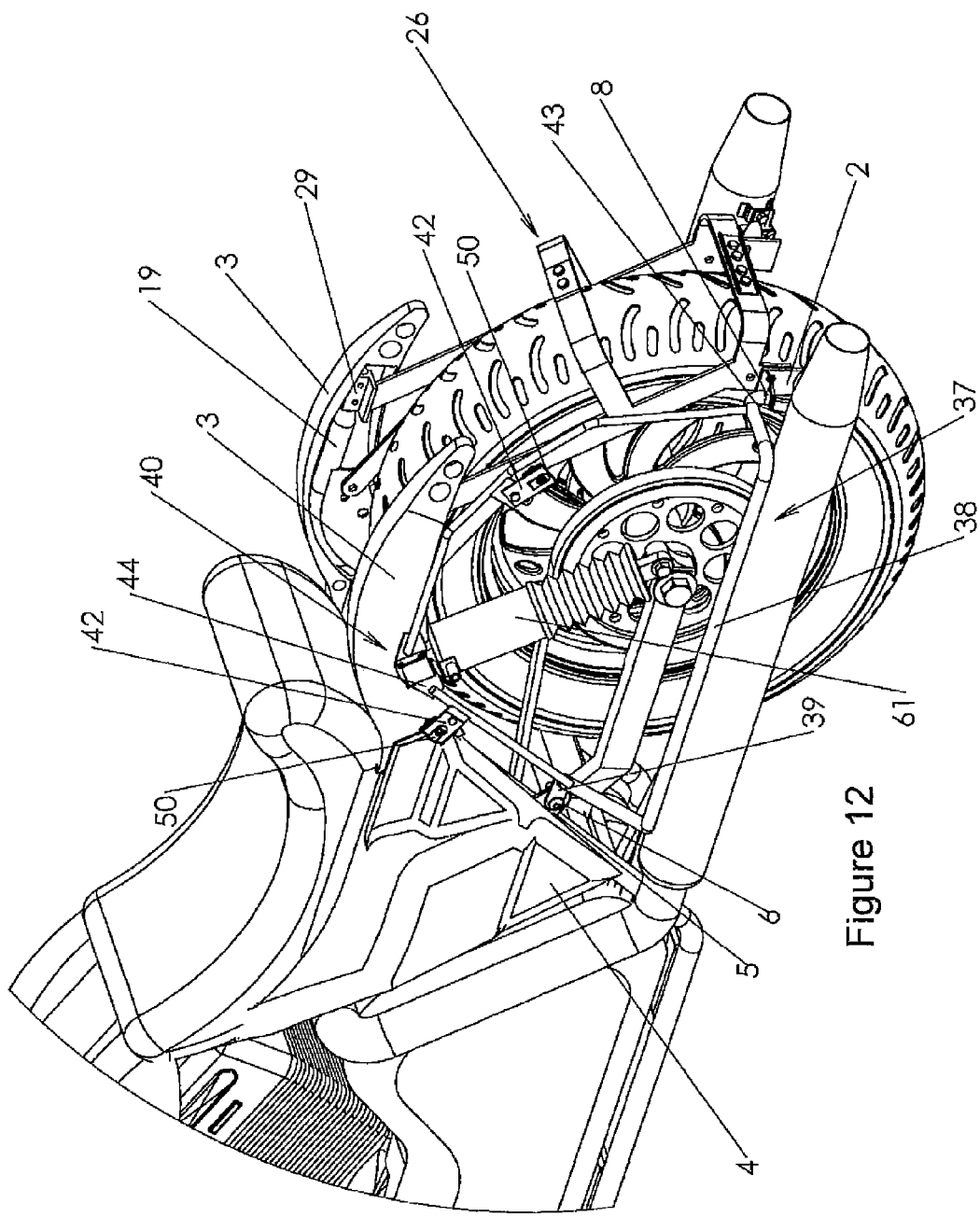
FIG. 12 is a perspective view of the saddle-bag-only frame of the present invention mounted on the motorcycle without the fender.

As discussed more fully in connection with FIG. 12, the present invention includes two types of external frames. The first is a saddle-bag-only frame, and the second is a tour pack/luggage frame. Both of these external frames attach to the motorcycle at three frame mounting points, all of which are visible in FIG. 1. The first frame mounting point 6 is located just to the rear of the side cover 4. The side cover 4 is included in this invention as a kit-specific aesthetic upgrade from the factory (prior art) side cover 14 included with the motorcycle at time of purchase. The second frame mounting point 7 is a combination shock absorber bolt and frame mounting point. The present invention does not involve any modification or relocation of the shock absorber bolt; the shock absorber bolt is located in the same position as on the factory motorcycle, but the factory shock absorber bolt is replaced with the fitting shown in FIG. 11. The third frame mounting point 8 is located on top of the rear composite fitting 2. This frame mounting point is shown more clearly in FIGS. 12 and 13.

Figure 3:
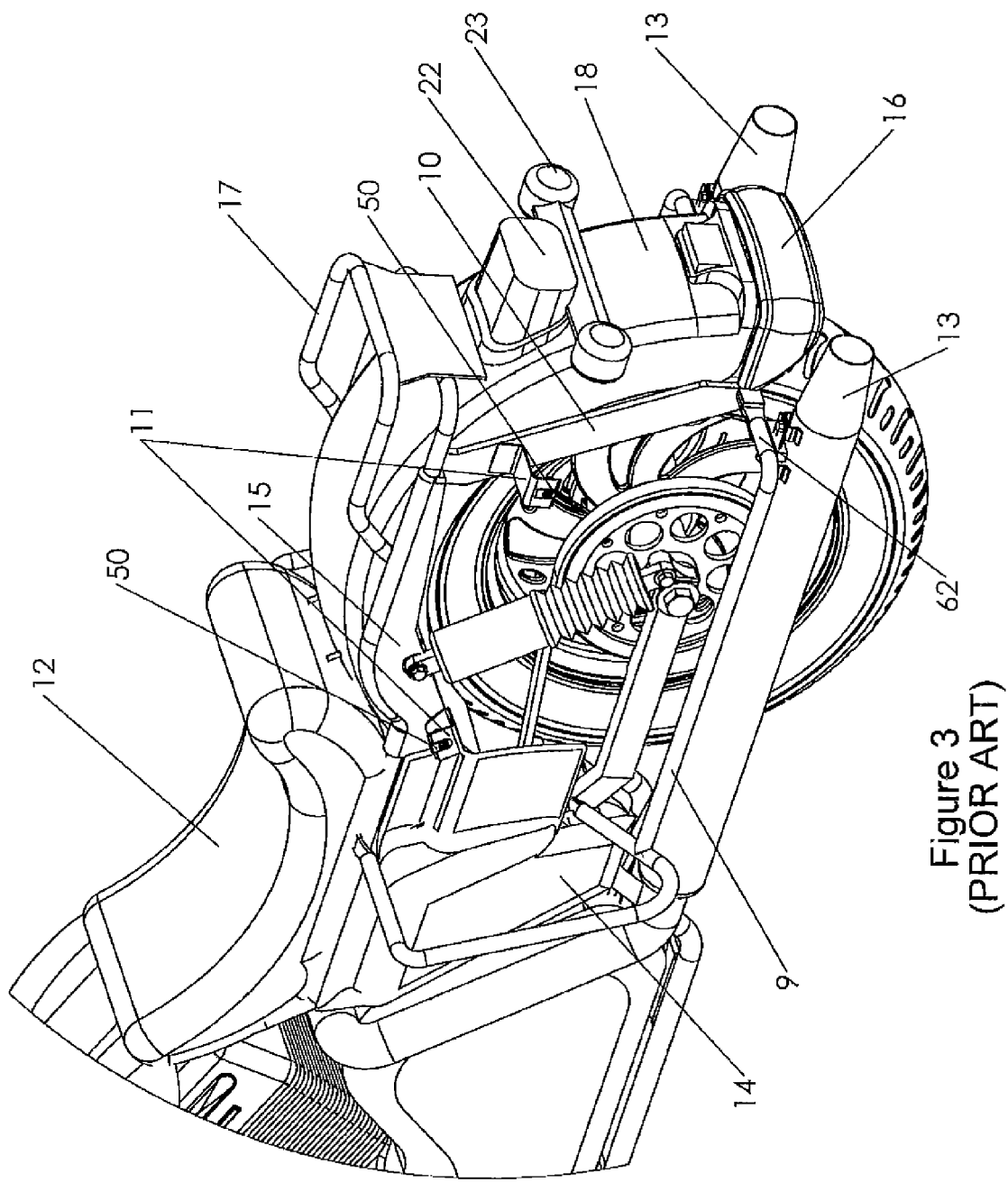
FIG. 3 is a perspective view of a factory (prior art) motorcycle with the saddle bags removed.

FIG. 3 is a perspective view of a factory (prior art) motorcycle with the saddle bags removed. The purpose of this figure is to show that when the saddle bags are removed from a factory motorcycle, the saddle bag frame 9, mounting bracket 10 for the saddle bag frame, and mounting points 11 for the saddle bags are all exposed, giving the motorcycle an unfinished look that is generally considered undesirable. Because these components are interconnected and bolted together, it is impossible in factory configuration to remove the unsightly support frame and mounting brackets without leaving the exhaust unsupported and exposing unpresentable sections of the fender and motorcycle frame.

Figure 4:
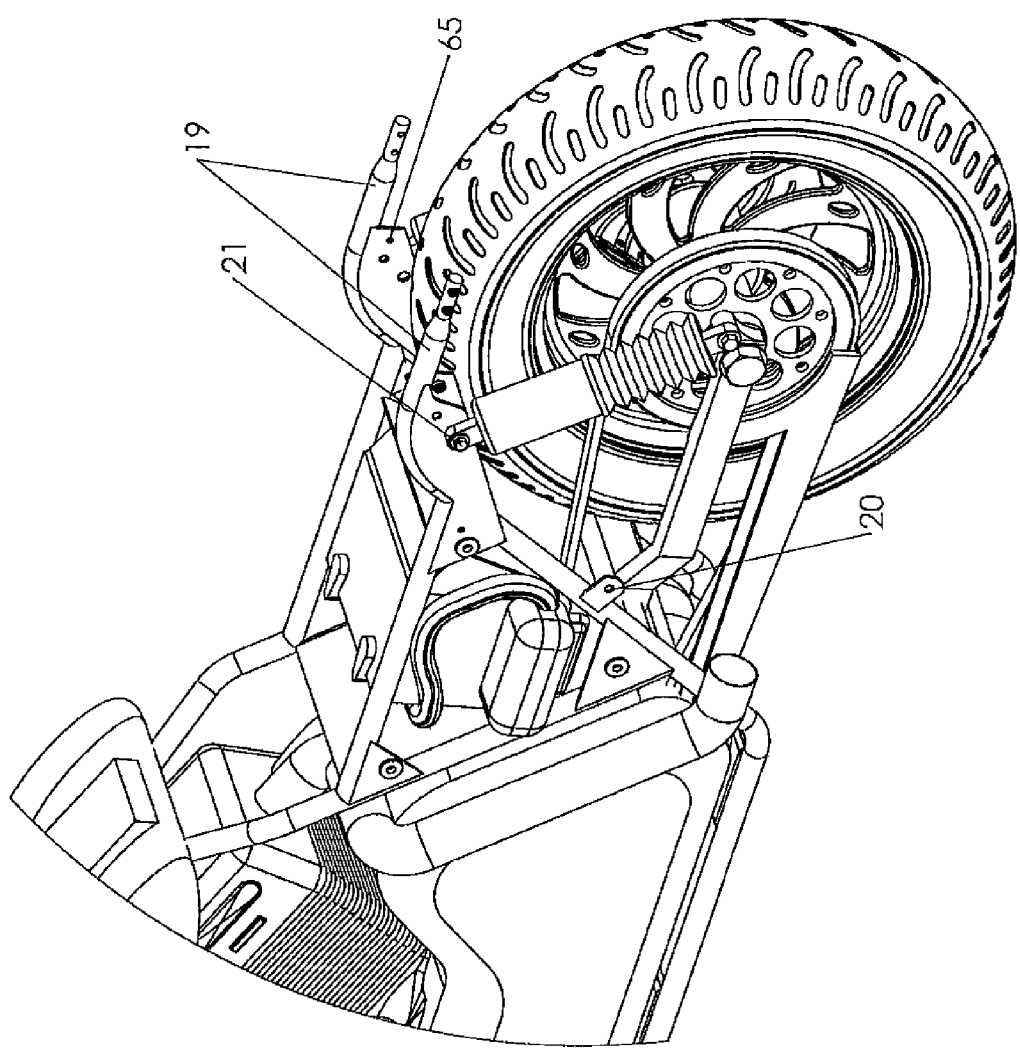
FIG. 4 is a perspective view of a factory (prior art) motorcycle stripped down to the frame with the factory fender removed.

In order to install the modification kit of the present invention, the first step is to strip the tail end of a factory motorcycle down to the frame, as shown in FIG. 4. To get the factory motorcycle to this point, the saddle bags (not shown), seat 12, mufflers 13, side covers 14, saddle bag frame 9 and mounting brackets 10, strut covers 15, rear structural member 16, luggage rack or tour pack mounting frame (if applicable) 17, and factory fender 18 are all removed. Before the factory fender is removed, the wiring harness (see reference number 46 on FIG. 5) must be unplugged. The wiring harness provides a connection between the tail and signal lights, on the one hand, and the light controls and power source, on the other hand. If new tail and signal lights are ordered with the modification kit, new wiring will be provided and must be spliced to the factory wiring harness as per included instructions; in that event, the wiring harness will be reinstalled in the same position on the new fender.

The saddle bag clips 50 (see FIGS. 3A and 3B) and rubber exhaust hanger grommets 48 (see FIG. 3C) are removed and reused. The rubber exhaust hanger grommets 48 fit inside of the exhaust hangers (see reference number 62 in FIG. 3 and reference number 47 in FIG. 13). The saddle bag clips 50 are reattached to the saddle bag mounting points 42 (see FIG. 12), and the rubber exhaust hanger grommets 48 are inserted into the built-in exhaust hangers 47 on the rear composite fittings 2 (see FIG. 13).

The goal of the present invention is to internalize the structural support for the saddle bag frame (shown externally in FIG. 3) so that it is located inside the fender, while at the same time providing external mounting points for removable saddle-bag-only or tour pack/luggage frames that are aesthetically consistent with the look of a finished motorcycle when the saddle bags and tour pack are not installed and that allow the rider to mount the saddle bags and/or tour pack quickly and without the use of any tools.

FIG. 4 shows the frame rails 19 of the motorcycle to which the internal frame (shown in FIG. 7) of the present invention will be attached. All Harley-Davidson touring motorcycles produced in and after 1997 have this same frame rail configuration, which allows the present invention to be used with any such Harley-Davidson touring motorcycle. FIG. 4 also shows the tab 20 of the motorcycle frame, which is preferably covered by the chrome frame tab cover 5 (see FIG. 1) of the present invention. In a factory motorcycle, this frame tab 20 is one point at which the saddle bag frame is bolted to the motorcycle frame. In addition, FIG. 4 shows the factory shock absorber bolt 21, which will be replaced with the combination shock absorber bolt/second frame mounting point 7 of the present invention.

Figure 5:
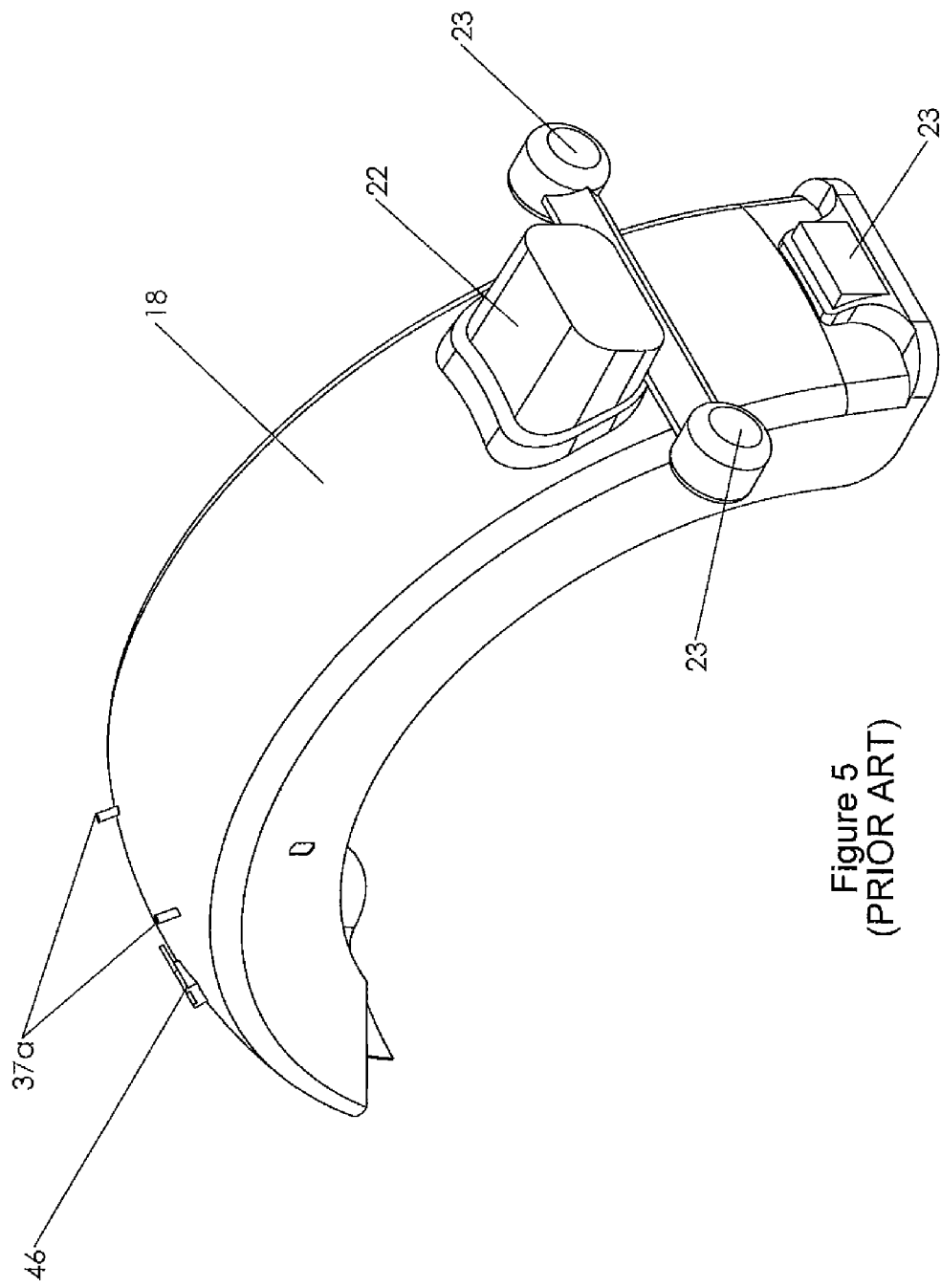
FIG. 5 is a perspective view of a factory (prior art) fender with the tail light and signal light assemblies still installed.

FIG. 5 is a perspective view of a factory (prior art) fender 18 with the tail light 22 and signal light 23 assemblies still installed. This figure also shows the wiring harness 46. Although the fenders shown in FIGS. 1 and 2 include different tail light and signal light assemblies (in the fenders shown in FIGS. 1 and 2, the tail light 24 is located directly above the license plate holder 25, and the signal lights (not shown) are located inside of the rear composite fittings 2), the present invention is not limited to any particular tail light, signal light or license plate frame configuration. In fact, one of the fender styles developed by the inventor is a fender that looks very similar to the prior art fender shown in FIG. 5 and reuses the factory tail and signal lights and license plate frame assemblies. Note, however, that the prior art fender shown in FIG. 5 does not accommodate the internal frame of the present invention (there is no internal frame in a factory fender).

Figure 6:
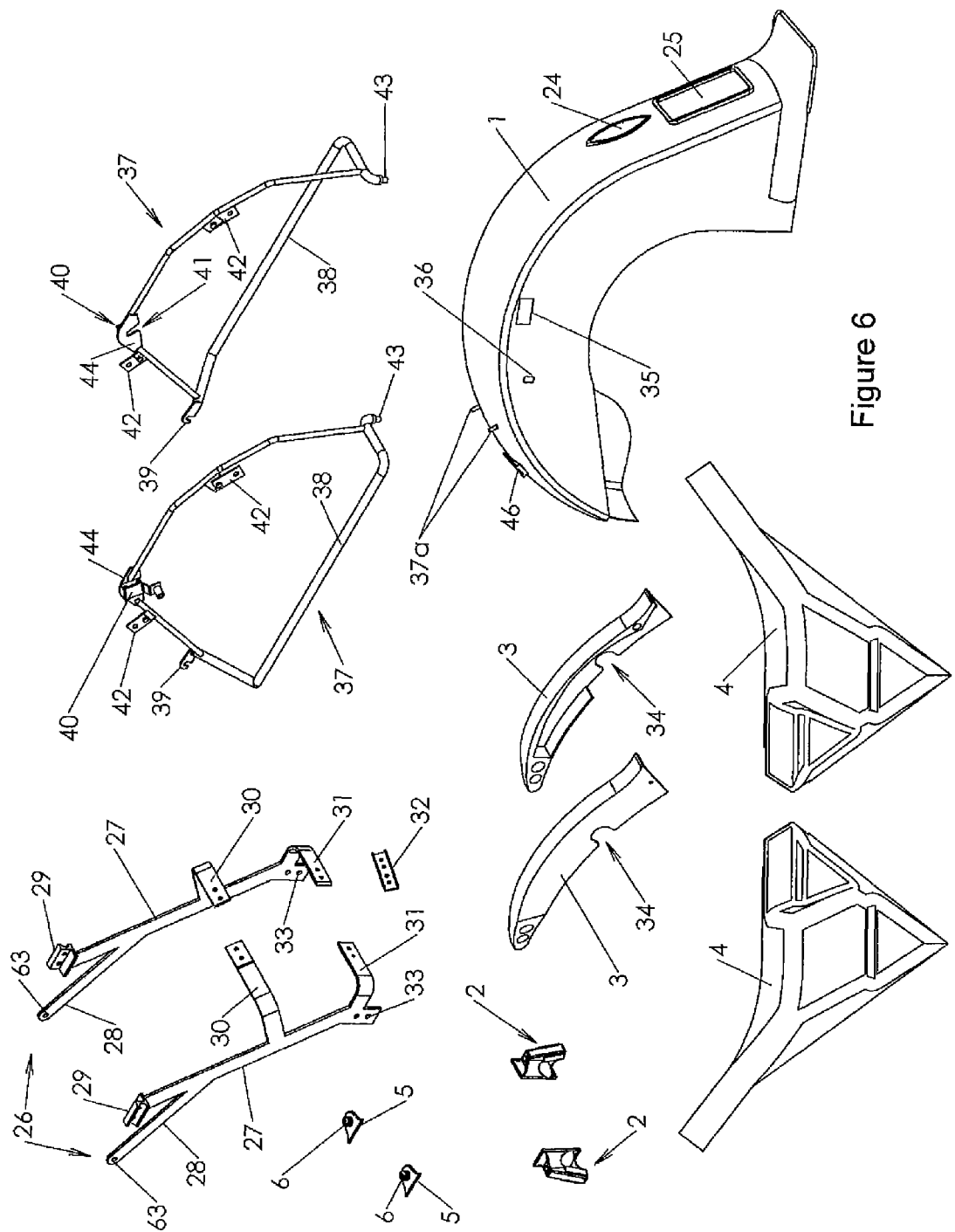
FIG. 6 is a composite view of the various parts that comprise the touring motorcycle modification kit of the present invention.

FIG. 6 is a composite view of the various parts that comprise the touring motorcycle modification kit of the present invention. The kit includes an internal frame 26, which comprises right- and left-hand portions, each of which comprises a main support arm 27, an attachment arm 28, a first cross-member 30, and a second cross-member 31. At the top of each main support arm 27 is a frame rail attachment piece 29. Located at the bottom of each main support arm 27 is a rear composite fitting attachment point 33. A cross-member attachment piece 32 connects the second cross-members 31 of the right- and left-hand portions of the internal frame. Alternatively, in lieu of using the cross-member attachment piece 32, the second cross-member 31 of one portion of the internal frame could be bolted directly to the second cross-member 31 of the other portion of the internal frame, similar to the manner in which the first cross-members 30 are attached to one another.

The kit includes the chrome frame tab cover 5 and first frame mounting point (or fitting) 6 shown in FIG. 1. It also includes the rear composite fittings 2 and strut covers 3. As shown in this figure, the strut covers 3 preferably comprise an indentation 34 that fits over the combination shock absorber bolt and second frame mounting point 7 (see FIG. 1).

As shown in FIG. 6, the kit includes two side covers. In theory, the factory side covers could be used, although they are not aesthetically consistent with the design of the fender of the present invention. For that reason, the inventor has designed two different styles of side covers for use with the fender of the present invention, only one of which is shown in FIG. 6. The style that is shown is deeper than the other style to accommodate a cruise control box lying underneath the side cover; the other style is shallower and is intended for use with motorcycles that do not have cruise control. The present invention is not limited to any particular type or design of side cover.

The kit includes a fender 1, which comprises a first aperture 35 through which the frame rail attachment piece 29 of the internal frame 26 protrudes. The fender also comprises a second aperture 36 through which a factory fender mounting fitting (see reference number 65 in FIGS. 9B, 11 and 14) is installed. This factory fender mounting fitting 65 is used to attach both the rear fender 1 and the internal frame 26 of the present invention (more particularly, the tip 63 of the attachment arm 28) to the motorcycle frame. In addition, the fender comprises two seat attachment points 37a, which are located in the same position as on a factory motorcycle.

Figure 6A:
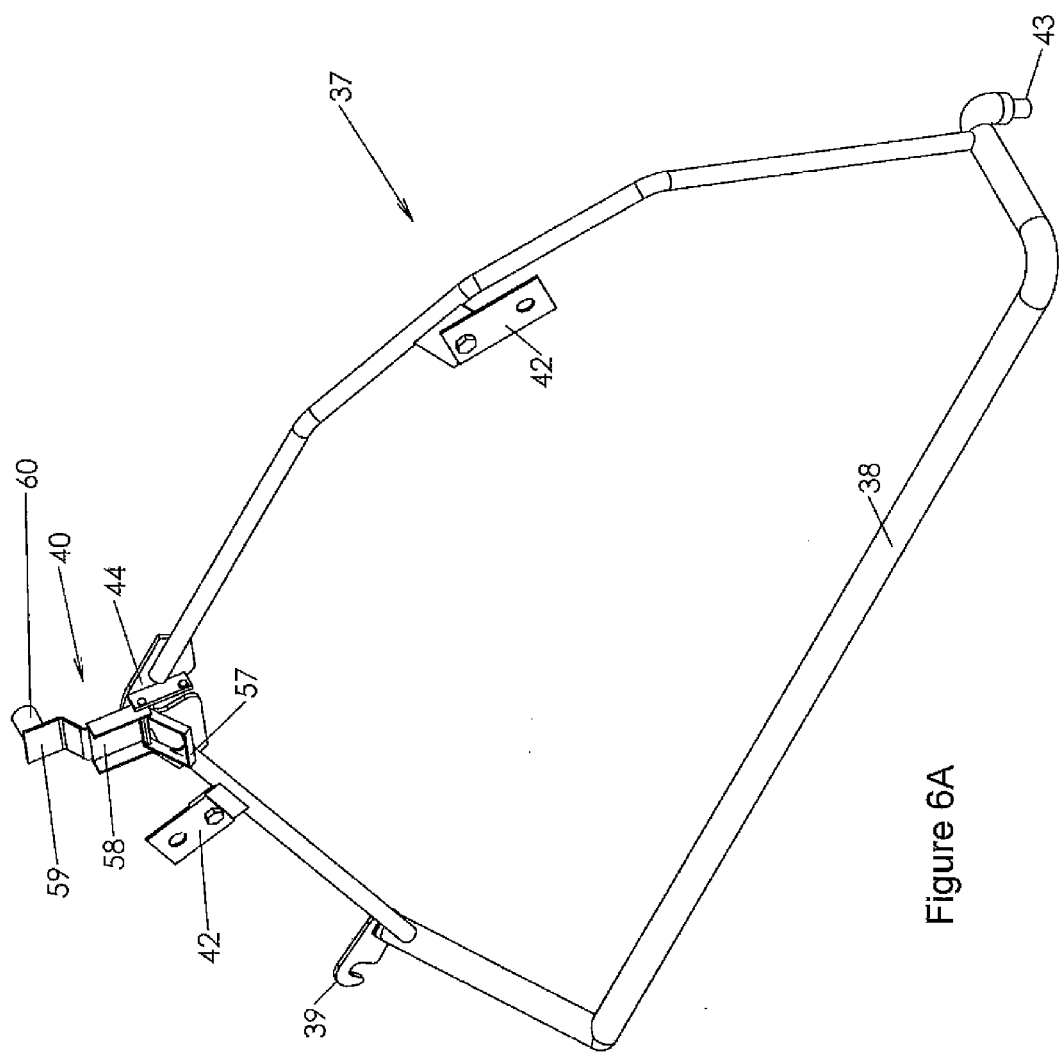
FIG. 6A is a detail view of the saddle-bag-only frame of the present invention.

In one embodiment of the present invention, the kit includes two saddle-bag-only frames 37, each of which is identical to the other except that one is designed for installation on the right-hand side of the vehicle, and the other is designed for installation on the left-hand side of the vehicle. Each saddle-bag-only frame 37 comprises a bottom support rung 38, a mounting extension 39, a latching mechanism 40, a plate 44 with a recess 41 behind the latching mechanism 40 for mounting over the second frame mounting point 7 (see FIG. 1), two saddle bag mounting points 42, and a mounting insertion piece 43 for insertion into the third frame mounting point 8 (shown best in FIGS. 12 and 13). FIG. 6A is a detail view of the saddle-bag-only frame.

Figure 6B:
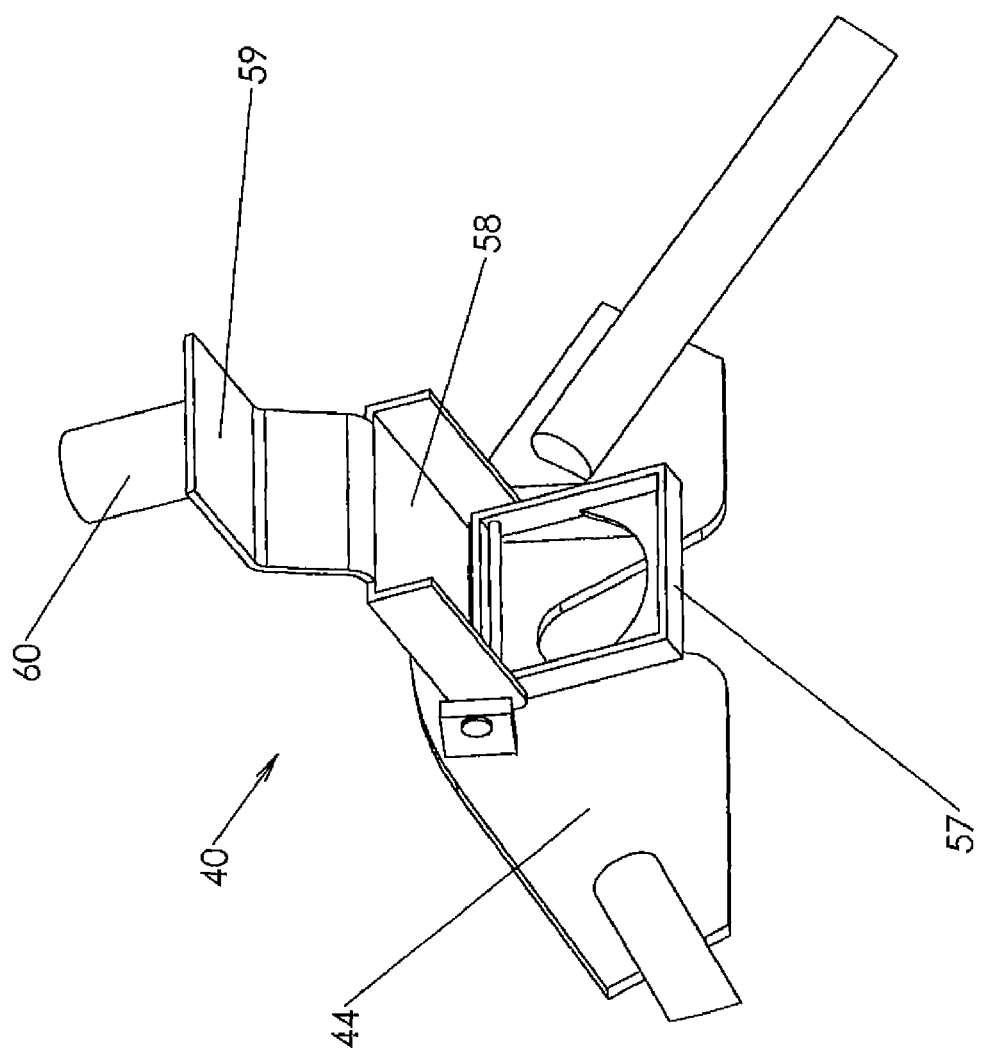
FIG. 6B is a detail view of one embodiment of the latching mechanism of the present invention.

FIG. 6B is a detail view of one embodiment of the latching mechanism of the present invention. In this embodiment, the latching mechanism 40 comprises a latching hoop 57, a cover 58, a cover extension 59, and a rubber stopper 60. Once the recess 41 in the plate 44 behind the latching mechanism 40 is placed over the combination shock absorber bolt/second frame mounting point 7, the latching hoop 57 is rotated behind the head of the shock absorber bolt, and the cover 58 is rotated downward utilizing offset pivot points to leverage the plate 44 and the latching hoop 57 together until both are secured tightly behind the head of the shock absorber bolt/second frame mounting point 7, thereby securing the external frame to the motorcycle and ensuring that the external frame is tightly connected and cannot shift or rattle with the vibration of a running engine. When engaged, the latch cover 58 covers the shock absorber bolt head, and the latch cover extension 59 lies over the shock absorber (see reference number 61 on FIG. 12). The purpose of the rubber stopper 60 is both to provide a handle for the engagement and operation of the latch, and also to prevent the latch from disengaging during operation of the motorcycle as it rests against the inward-facing side of the saddle bag when the saddle bag is installed on the motorcycle. The present invention is not limited to any particular type of latching mechanism; however, the preferred latching mechanism is constructed so that the external frame (i.e., either the saddle-bag-only frame or the tour pack/luggage frame) is effectively locked to the motorcycle when the saddle bags are attached to the external frame and locked using factory-provided or after-market saddle bag locks (see reference number 64 on FIG. 18). This provides an added security feature.

In an alternate embodiment of the present invention, the kit includes a tour pack/luggage frame (see FIG. 19A) in lieu of the saddle-bag-only frame. Like the saddle-bag-only frame, the tour pack/luggage frame comprises a bottom support rung, a mounting extension, a latching mechanism, a plate with a recess behind the latching mechanism for mounting over the second frame mounting point, two saddle bag mounting points, and a mounting insertion piece for insertion into the third frame mounting point. Unlike the individual right- and left-side saddle-bag-only frames, the tour pack/luggage frame is one piece, and it provides a platform above the rear fender on which to mount either the factory tour pack 53 and backrest 54, an optional sissy bar 56, or other luggage which may be strapped directly to the luggage rack 55.

The kit also includes various fasteners, which are not shown in FIG. 6.

Figure 7:
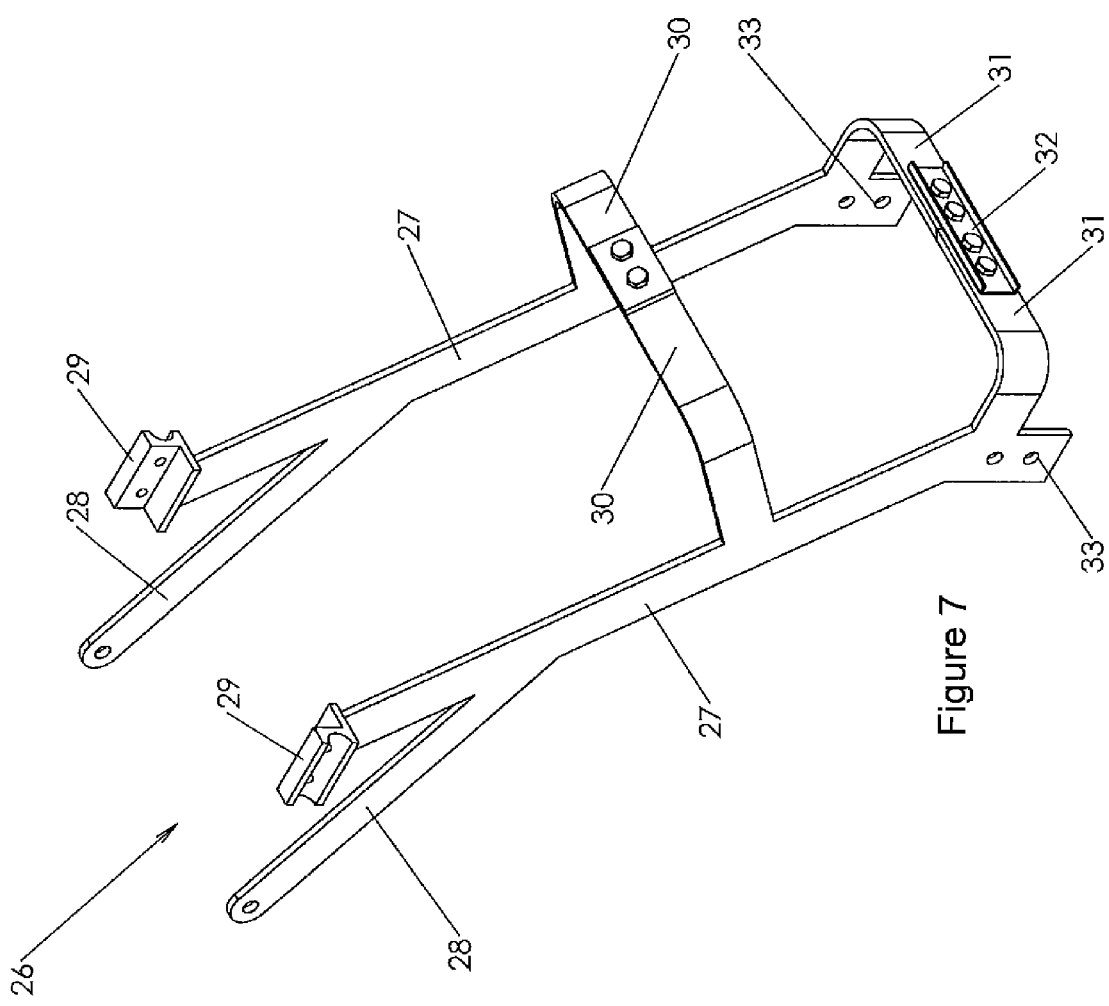
FIG. 7 is a perspective view of the right- and left-hand portions of the internal frame loosely bolted together.

Once the factory motorcycle has been stripped down as shown in FIG. 4, the right- and left-hand portions of the internal frame are positioned inside of the fender and then loosely bolted together to allow movement of each portion of the internal frame relative to the other during installation, as shown in FIG. 7. At this point, the frame rail attachment pieces 29 extend through the first apertures 35 in the fender 1. FIGS. 8A, 8B and 8C are a top view, side view and perspective view, respectively, of the internal frame of the present invention mounted inside of the fender 1 prior to installation on the motorcycle.

Next, the internal frame and fender are positioned over the frame rails 19 of the motorcycle. FIGS. 9A, 9B and 9C show the position of the internal frame in relation to the motorcycle frame without the fender (although technically the fender would be present). As shown most clearly in FIG. 9B, the internal frame 26 is attached to the motorcycle frame at three points, two of which are located on the frame rail attachment pieces 29. The third attachment point is on the tip of the attachment arm 28. Once these attachment points are securely fastened to the motorcycle frame, the loosely bolted internal frame members are securely bolted together, ensuring a proper fit in each application regardless of minor factory discrepancies between individual motorcycle frame dimensions. Next, the rear composite fitting attachment points 33 on the internal frame are bolted to the rear composite fittings 2 (with the bolt passing through the fender). At this point, the motorcycle frame has been effectively extended over and around the rear wheel down to the rear composite fitting attachment points 33 such that the rear composite fittings can bear substantial weight.

Figure 10:
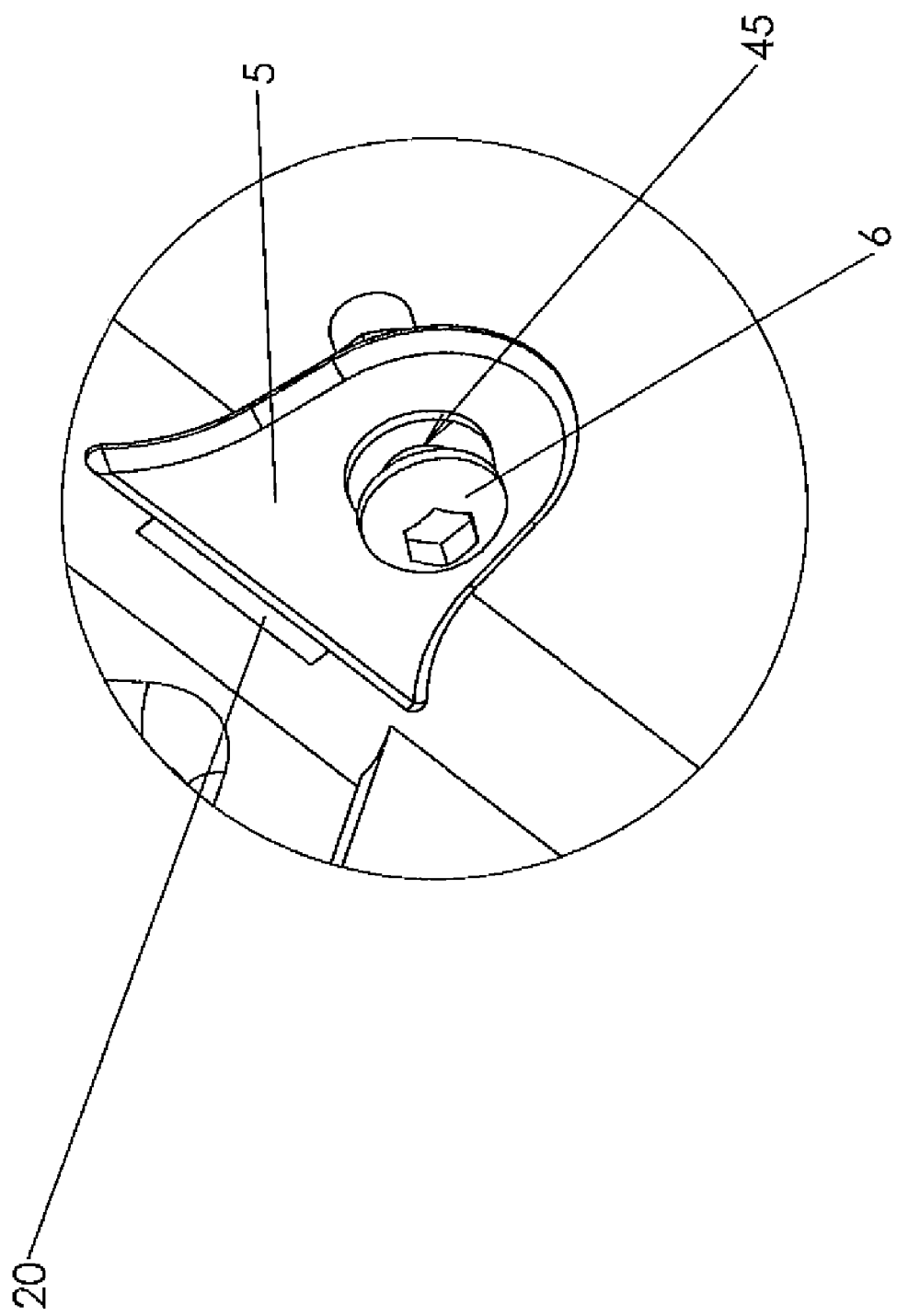
FIG. 10 is a detail view of the first frame mounting point of the present invention.

The next step in the process is for the chrome frame tab cover 5 and first frame mounting point 6 to be installed. FIG. 10 is a detail view of the first frame mounting point 6. The chrome frame tab cover 5 is designed to conceal the tab 20 on the motorcycle frame shown in FIG. 4. When the saddle-bag-only or tour pack/luggage frame is installed, the mounting extension 39 fits over the first frame mounting point 6, and the recess 41 in the plate 44 behind the latching mechanism 40 fits over the combination shock absorber bolt/second frame mounting point 7. The first and second frame mounting points 6, 7 are both designed with a gap 45 into which the mounting extension 29 and the plate 44 behind the latching mechanism 40 fit, respectively.

FIG. 11 is a detail view of the combination shock absorber bolt and second frame mounting point 7 of the present invention before the strut cover 3 (not shown) is installed. In the present invention, the standard shock absorber bolt from the factory motorcycle is replaced with the fitting shown in FIG. 11.

With the internal frame 26 and fender 1, chrome frame tab cover 5 and first frame mounting point 6, and combination shock absorber bolt and second frame mounting point 7 installed, as well as the strut covers and side covers, and with the seat and mufflers reinstalled (the method of reinstalling the mufflers is discussed below in connection with FIG. 13), the motorcycle is now ready to be ridden as is (without the saddle-bag-only or tour pack/luggage frame). Alternatively, the saddle-bag-only or tour pack/luggage frame can be installed easily, quickly and without the use of any tools, as discussed below.

FIG. 12 is a perspective view of the saddle-bag-only frame of the present invention mounted on the motorcycle without the fender. The fender has been removed from this figure to show the orientation of the saddle-bag-only frame in relation to the other parts of the motorcycle. As shown in this figure, the bottom support rung 38 of the saddle-bag-only frame is in the same position as on the factory motorcycle (see reference number 9 in FIG. 3). The three frame mounting points 6, 7 (which is concealed underneath the latching mechanism 40) and 8 roughly form a triangle. The saddle bag mounting points 42 are in the same position as on the factory motorcycle (see FIG. 3).

Figure 13:
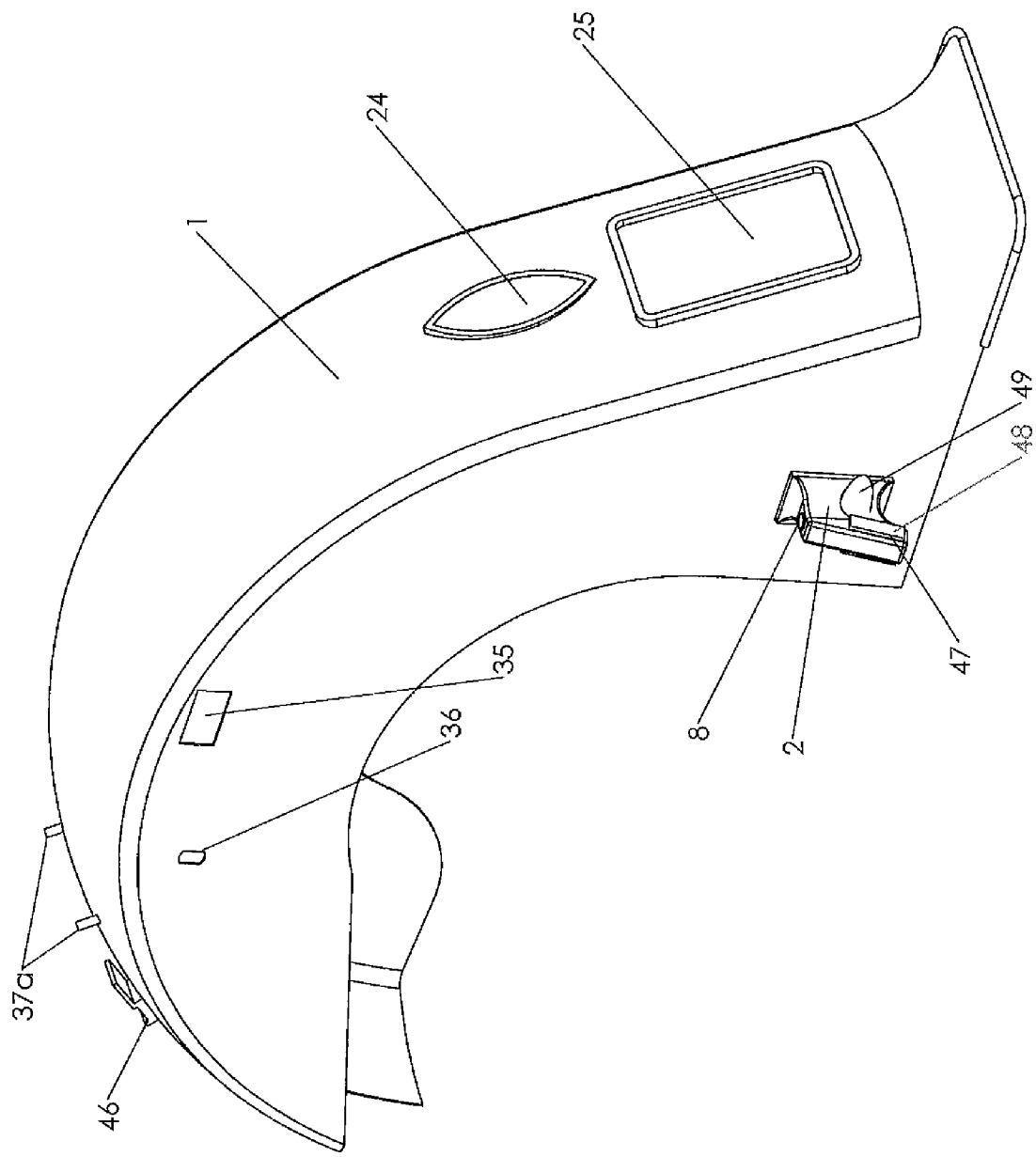
FIG. 13 is a perspective view of one embodiment of the fender of the present invention showing the rear composite fitting on the bottom left-hand side of the fender as it would appear when mounted to the internal frame.

FIG. 13 is a perspective view of one embodiment of the fender 1 of the present invention showing the rear composite fitting 2 on the bottom left-hand side of the fender. Each rear composite fitting 2 comprises a third frame mounting point 8, a built-in exhaust hanger 47, and an LED signal light 49. The built-in exhaust hanger 47 is compatible with the factory exhaust mounting system, including the re-use of the factory rubber grommet 48. Due to the change in angle of the present invention's rear composite fitting exhaust hangers 47 from that of the factory exhaust hanger 62 (compare FIGS. 13 and 3), the left and right mufflers are switched and rotated forty-five degrees (45°) to conceal and utilize the rear axle clearance dimples set in the muffler from the factory. The mufflers are reattached using the same rubber exhaust hanger grommets and steel clamps as on the factory motorcycle.

Figure 14:
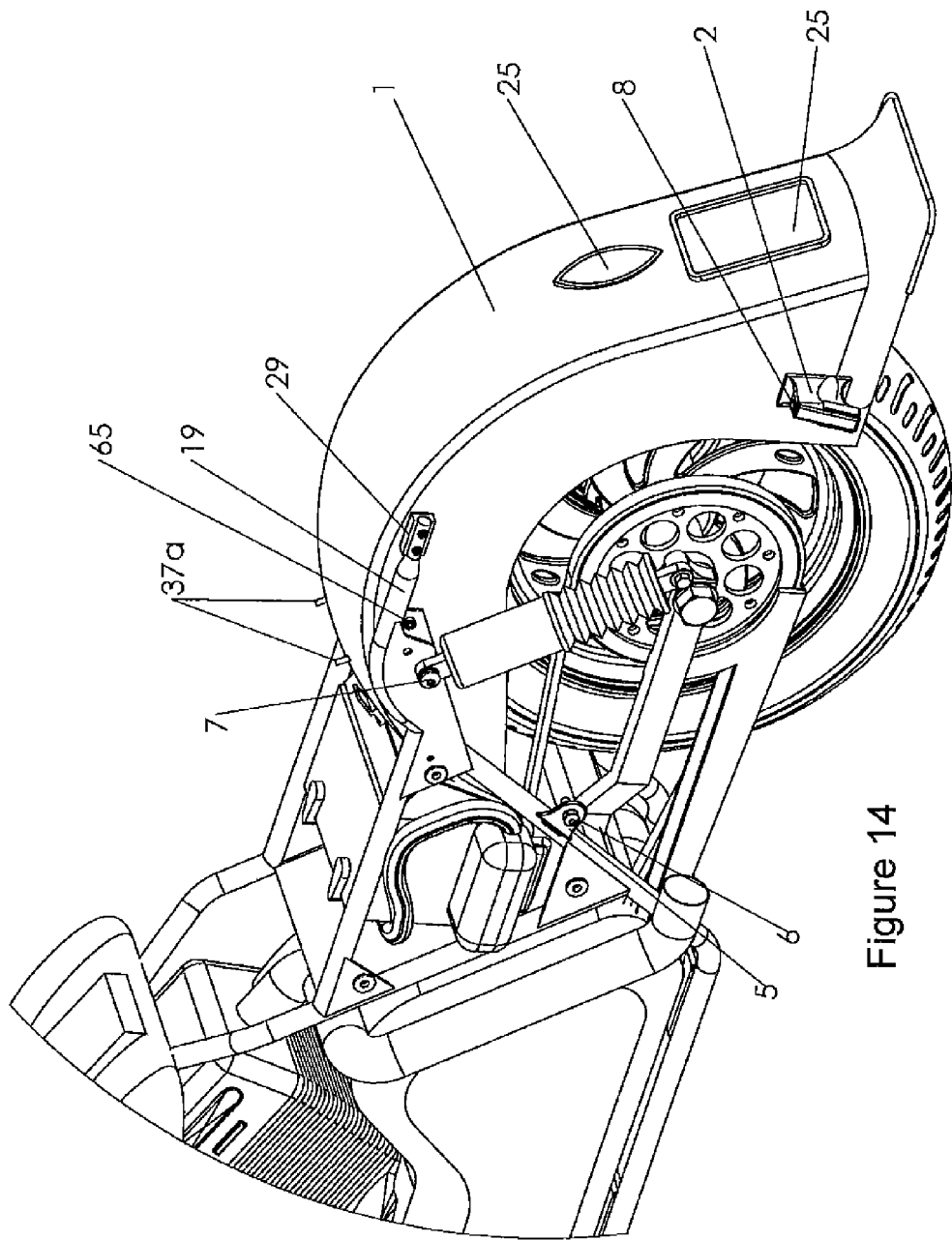
FIG. 14 is a perspective view of one embodiment of the fender of the present invention installed on the motorcycle but without the strut covers, side covers, seat or exhaust system (mufflers).
Figure 15:
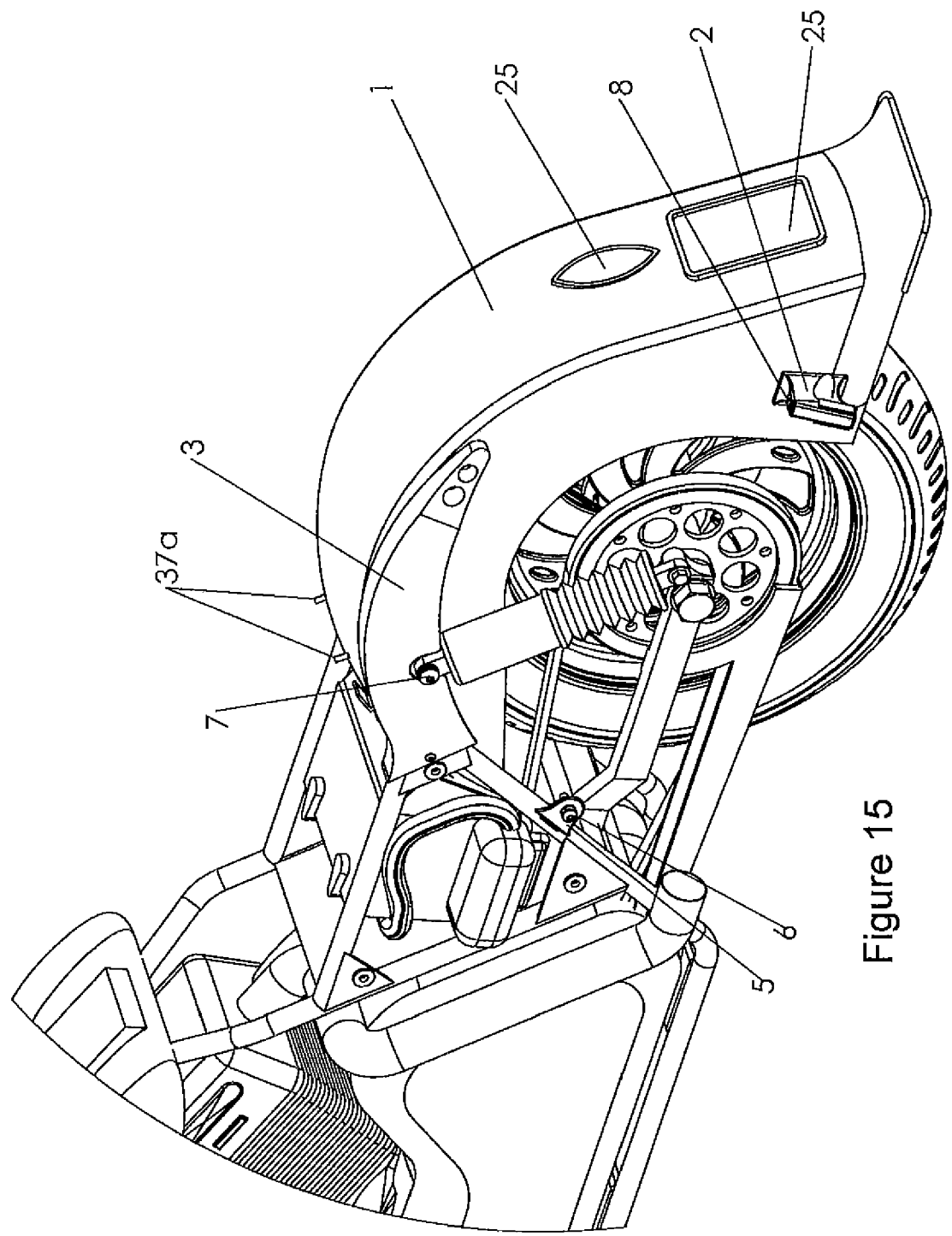
FIG. 15 is a perspective view of the motorcycle shown in FIG. 14 but with the strut covers installed.
Figure 16:
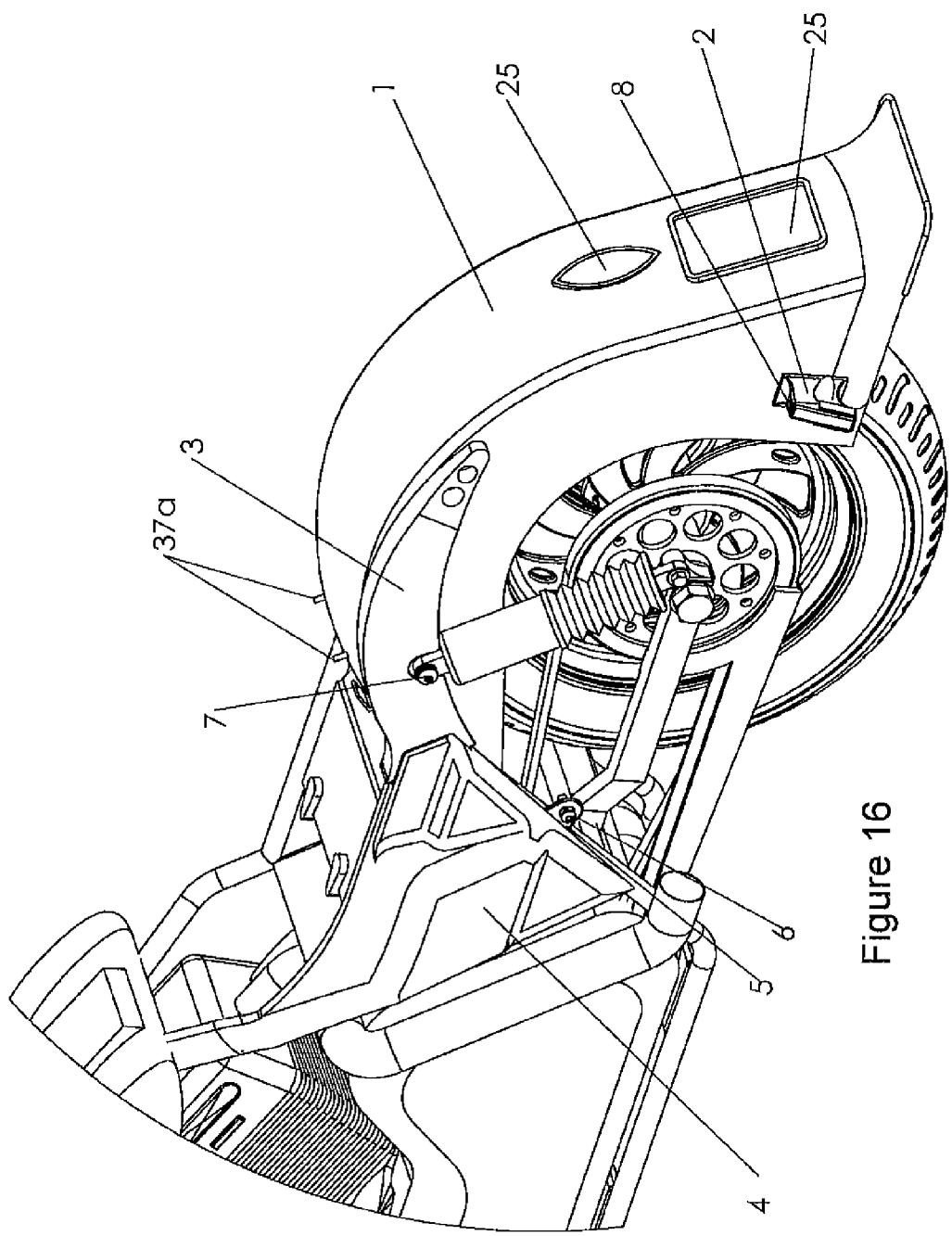
FIG. 16 is a perspective view of the motorcycle shown in FIG. 15 but with the side covers installed.

FIGS. 14-18 illustrate the process described above. FIG. 14 is a perspective view of the motorcycle with the fender and internal frame of the present invention installed, as well as the chrome frame tab cover 5 and first frame mounting point 6 and the combination shock absorber bolt/second frame mounting point 7. The strut covers, side covers, seat and exhaust system (mufflers) have not been installed in this view. FIG. 15 is a perspective view of the motorcycle shown in FIG. 14 but with the strut covers 3 installed. FIG. 16 is a perspective view of the motorcycle shown in FIG. 15 but with the side covers 4 installed.

Figure 17:
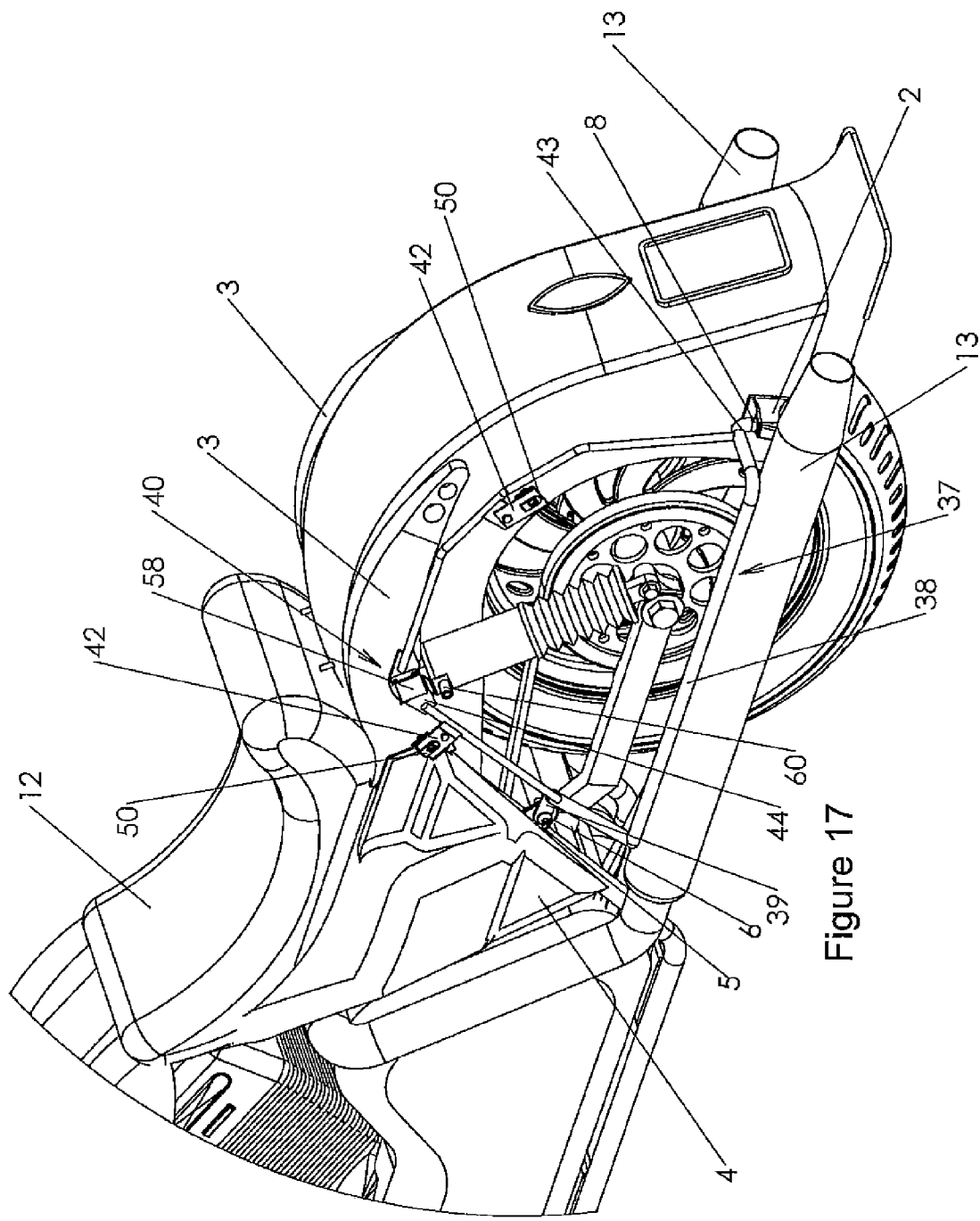
FIG. 17 is a perspective view of the motorcycle shown in FIG. 16 but with the seat 12 and mufflers 13 reinstalled and the saddle-bag-only frame 37 installed.
Figure 18:
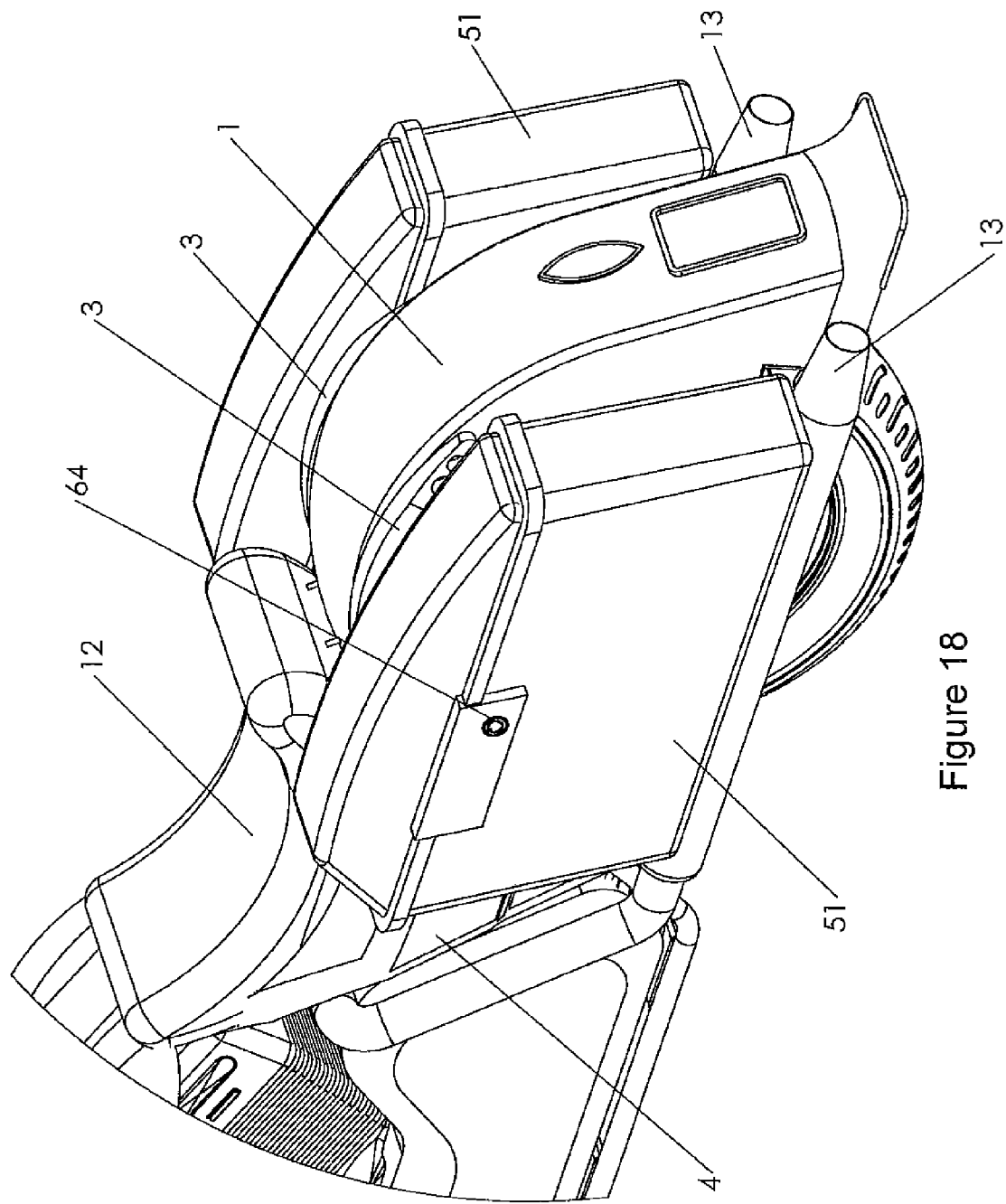
FIG. 18 is a perspective view of the same motorcycle shown in FIG. 17 but with the saddle bags installed.

FIG. 17 is a perspective view of the motorcycle shown in FIG. 16 but with the seat 12 and mufflers 13 reinstalled and the saddle-bag-only frame 37 installed. FIG. 18 is a perspective view of the same motorcycle shown in FIG. 17 but with the saddle bags 51 installed. To install the saddle bags 51, the same installation system is used as on the factory motorcycles, namely, the quarter-turn fastener pin that is provided with the factory saddle bags is inserted from the inside of the saddle bag out through a hole in the back of the saddle bag, and that pin engages with the saddle bag clips shown in FIGS. 3A and 3B, thereby securing the saddle bag.

Figure 19:
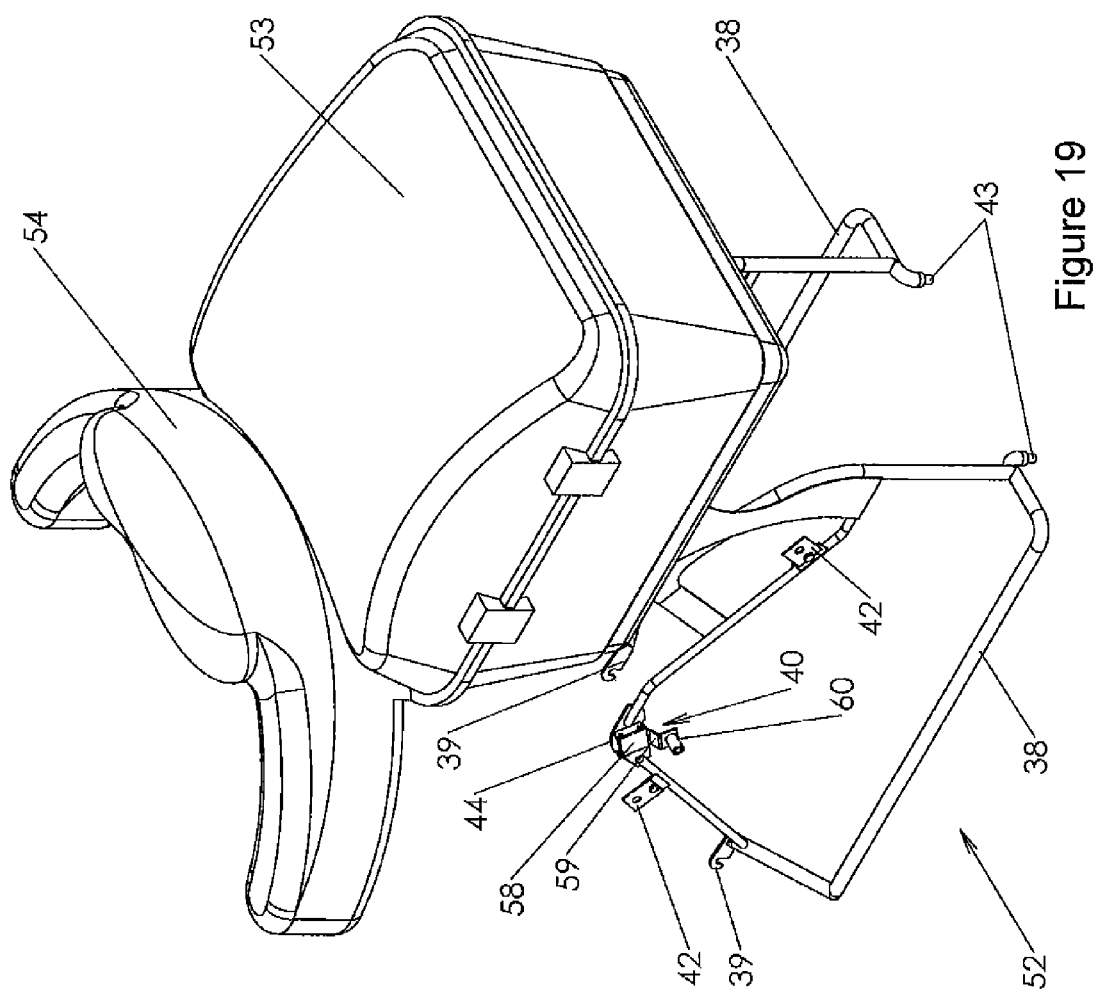
FIG. 19 is a perspective view of the tour pack/luggage frame of the present invention shown with a tour pack and backrest installed but without saddle bags.
Figure 19A:
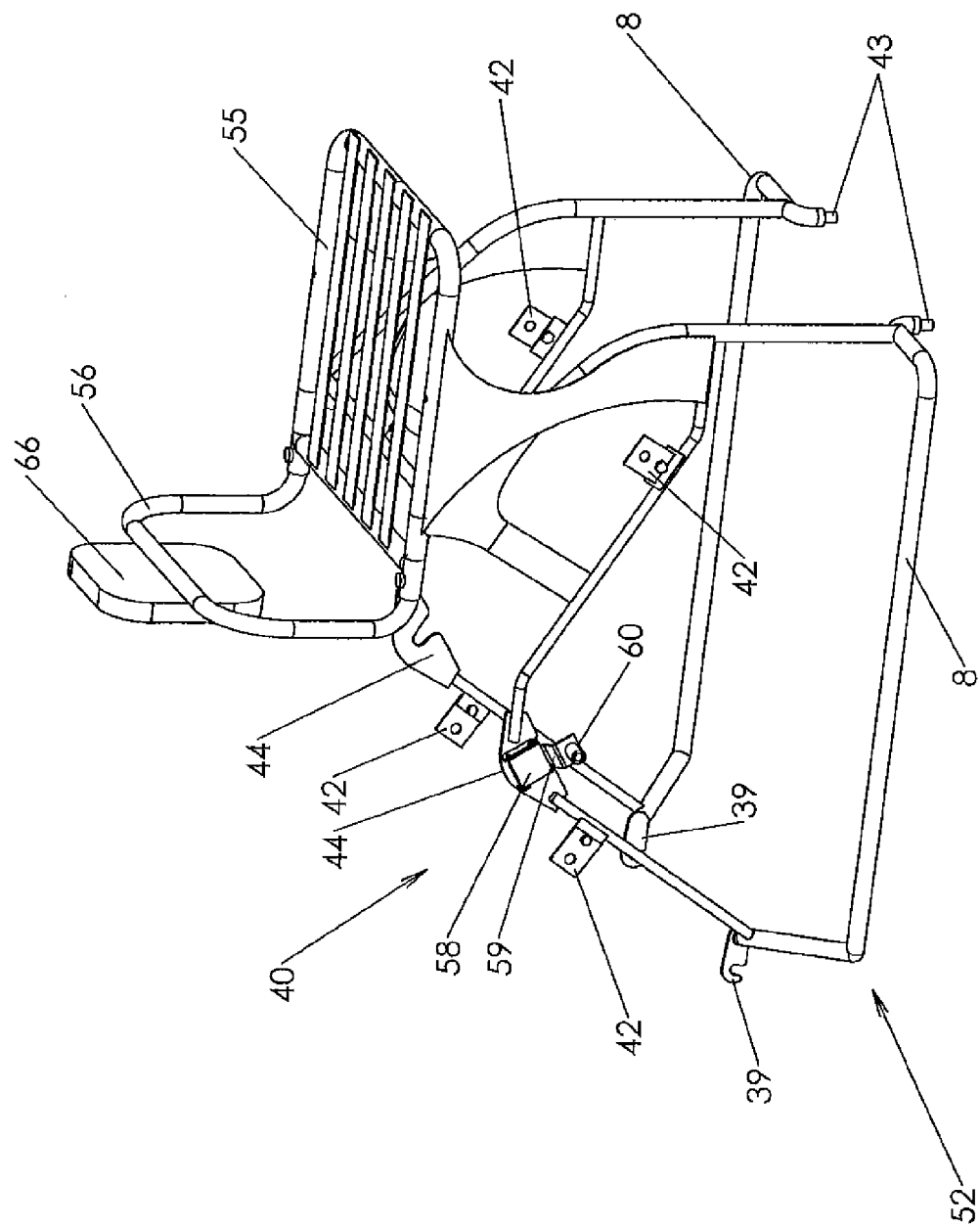
FIG. 19A is a perspective view of the tour pack/luggage frame of the present invention shown without the tour pack and backrest and with the sissy bar.

FIG. 19 is a perspective view of the tour pack/luggage frame 52 of the present invention shown with a tour pack 53 and backrest 54. FIG. 19A is a perspective view of the tour pack/luggage frame of the present invention shown with the optional sissy bar 56 installed instead of the tour pack 53 and backrest 54, and leaving the luggage rack 55 available for strapping on additional luggage. The tour pack/luggage frame 52 of the present invention mounts in the same manner as the saddle-bag-only frame 37; that is, there are first 6, second 7 and third 8 mounting points on the motorcycle that correspond to the mounting extension 39, recess (not shown) in the plate 44 behind the latching mechanism 40, and mounting insertion point 43, respectively. FIG. 19A is a perspective view of the tour pack/luggage frame 52 without the tour pack 53 and backrest 54. As shown in this figure, the tour pack/luggage frame 52 comprises an optional sissy bar 56 that can be used in lieu of the tour pack 53 and backrest 54 to hold luggage. The sissy bar optionally comprises a padded backrest 66 (shown in FIG. 19A). Because the tour pack/luggage frame mounts to the motorcycle in the same manner as the saddle-bag-only frame, either the saddle-bag-only frame or the tour pack/luggage frame could be used with the same motorcycle.

Figure 20:
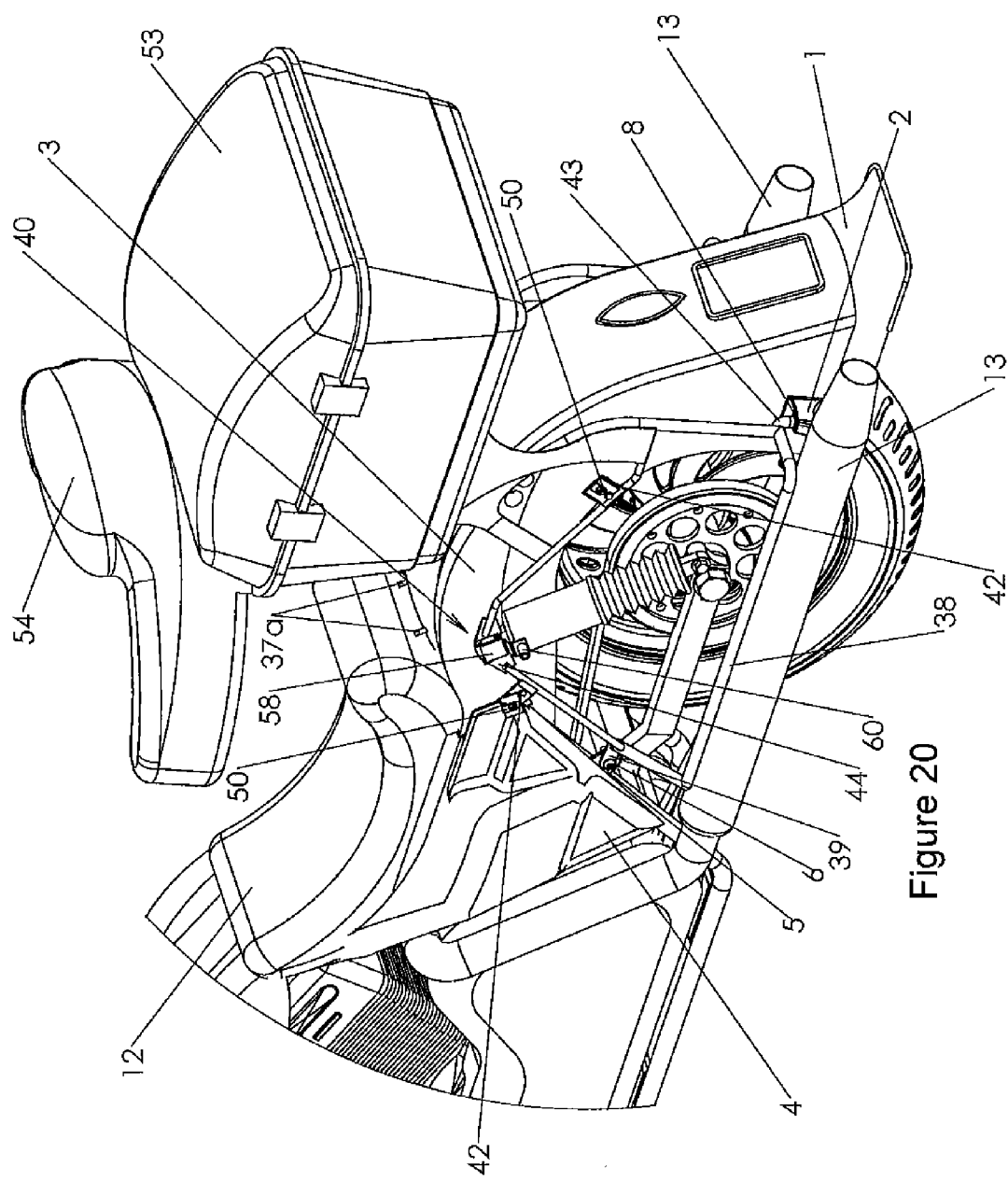
FIG. 20 is a perspective view of the tour pack/luggage frame and tour pack and backrest installed on a motorcycle.
Figure 21:
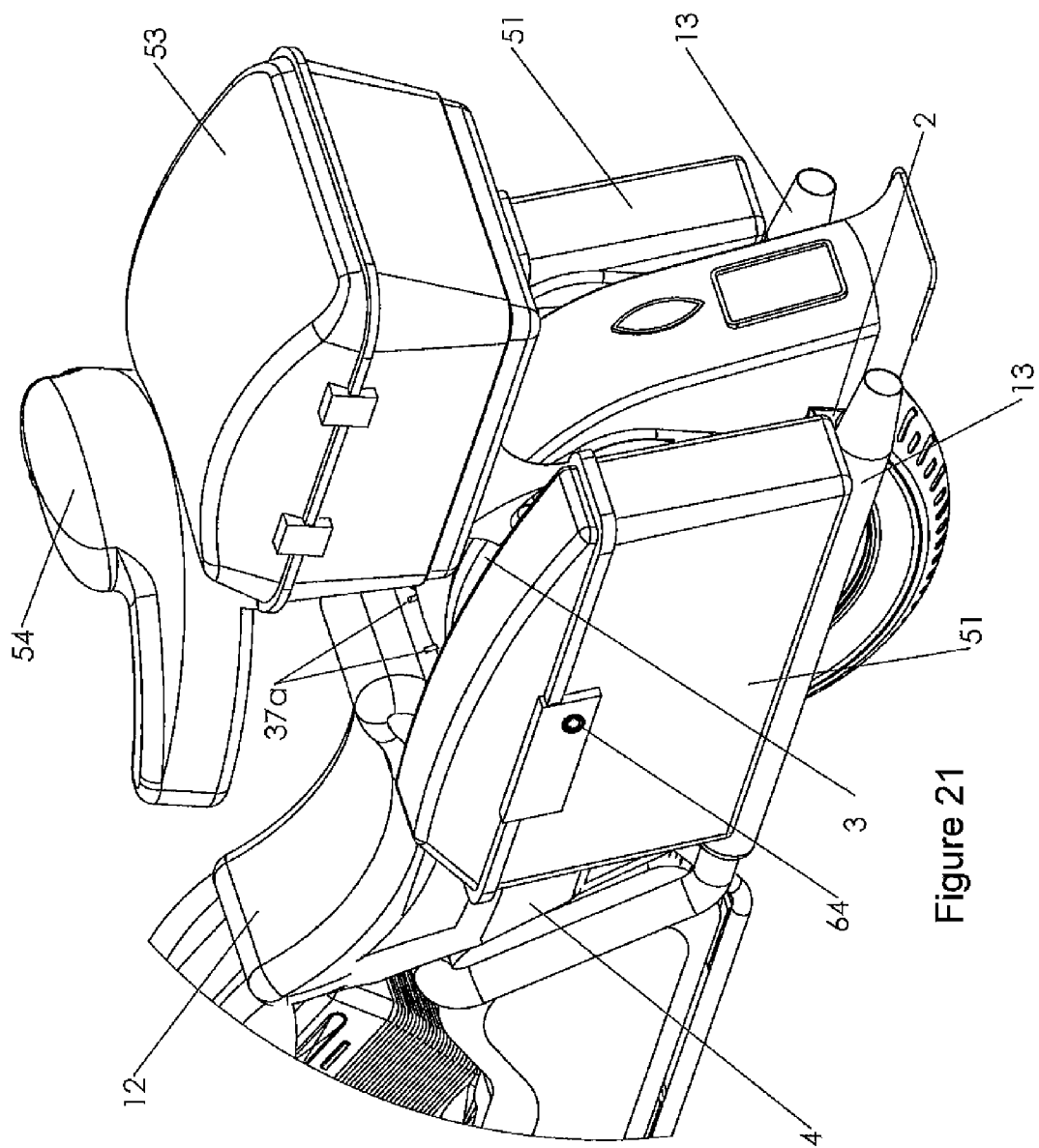
FIG. 21 is a perspective view of the motorcycle shown in FIG. 20 but with the saddle bags installed.

FIG. 20 is a perspective view of the tour pack/luggage frame 52 and tour pack 53 and backrest 54 installed on a motorcycle. FIG. 21 is a perspective view of the motorcycle shown in FIG. 20 but with the saddle bags 51 installed. The saddle bags 51 are installed in the same manner as described above in connection with FIG. 18. Note that the second seat (which would ordinarily sit on top of the seat attachment points 37*a*) is not shown in FIGS. 20 and 21 for clarity purposes, but ordinarily the second seat would be used with the tour pack and backrest.

Figure 22:
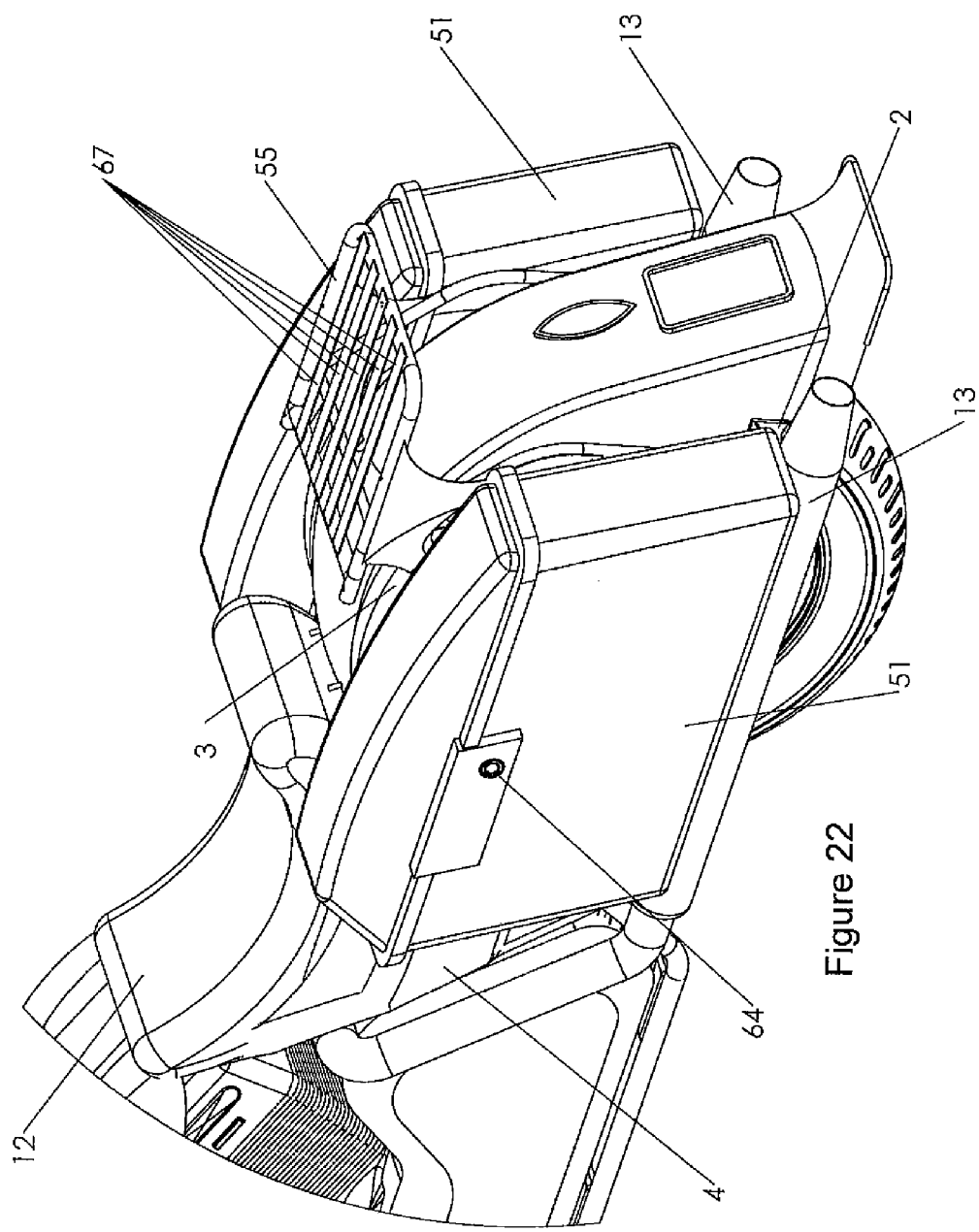
FIG. 22 is a perspective view of the tour pack/luggage frame and saddle bags installed on a motorcycle without the tour pack and backrest.

FIG. 22 is a perspective view of the tour pack/luggage frame 52 and saddle bags 51 installed on a motorcycle without the tour pack 53 and backrest 54 or sissy bar 56. Either the tour pack 53 and backrest 54 or the sissy bar 56 can be attached by simply bolting the component onto the luggage rack 55 portion of the tour pack/luggage frame 52. The luggage rack 55 may have slats 67 that run from front to back (as shown) or side to side on the luggage rack, or the luggage rack may be without slats altogether.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A touring motorcycle modification kit comprising:
(a) an internal frame;
(b) an external frame; and
(c) a fender:,
wherein the fender is situated between the internal and external frames;
wherein the internal frame is situated inside of the fender;
wherein the internal frame comprises two portions, and wherein the two portions are bolted together;
wherein the external frame is mounted on the motorcycle at three frame mounting points;
wherein two of the three frame mounting points are located on the exterior of the fender;
wherein none of the three frame mounting points is located inside of the fender;
wherein the external frame does not bolt to the frame mounting points but is releasably attached to the three frame mounting points;
wherein no tools are required to install or remove the external frame;
wherein the external frame comprises two saddle-bag-only frames;
wherein each saddle-bag-only frame comprises a bottom support rung, a mounting extension, a latching mechanism, a plate behind the latching mechanism, two saddle bag mounting points, and a mounting insertion piece; and
wherein the mounting extension fits over a first frame mounting point, the plate behind the latching mechanism fits over a second frame mounting point, and the mounting insertion piece fits into a third frame mounting point.

2. The touring motorcycle modification kit of claim 1, wherein the latching mechanism comprises a latching hoop, a cover, a cover extension, and a rubber stopper,
wherein one of the three frame mounting points is a combination shock absorber bolt and frame mounting point,
wherein when the external frame is installed, the latching hoop and the cover rotate downward to cover the combination shock absorber bolt and second frame mounting point, and
wherein the rubber stopper is located on the cover extension and prevents the latch from disengaging during operation of the motorcycle when a saddle bag is installed on the motorcycle.

3. A touring motorcycle modification kit comprising;
(a) an internal frame;
(b) an external frame;
(c) a fender; and
(d) two rear composite fittings:,
wherein the fender is situated between the internal and external frames;
wherein the internal frame is situated inside of the fender;
wherein the internal frame comprises two portions, and wherein the two portions are bolted together;
wherein the external frame is mounted on the motorcycle at three frame mounting points;
wherein two of the three frame mounting points are located on the exterior of the fender;
wherein none of the three frame mounting points is located inside of the fender;
wherein the external frame does not bolt to the frame mounting points but is releasably attached to the three frame mounting points;
wherein no tools are required to install or remove the external frame,
wherein each rear composite fitting is located on either side of the fender;
wherein one of the three frame mounting points is located on top of each rear composite fitting; and
wherein each rear composite fitting comprises an LED signal light and a built-in exhaust hanger.

4. A touring motorcycle modification kit comprising:
(a) an internal frame;
(b) an external frame; and
(c) a fender;
wherein the fender is situated between the internal and external frames;
wherein the internal frame is situated inside of the fender;
wherein the internal frame comprises two portions, and wherein the two portions are bolted together;
wherein the external frame is mounted on the motorcycle at three frame mounting points;
wherein two of the three frame mounting points are located on the exterior of the fender;
wherein none of the three frame mounting points is located inside of the fender;
wherein the external frame does not bolt to the frame mounting points but is releasably attached to the three frame mounting points;
and wherein no tools are required to install or remove the external frame;
wherein the external frame comprises a bottom support rung, a mounting extension, a latching mechanism, a plate behind the latching mechanism, two saddle bag mounting points, and a mounting insertion piece on either side of the fender;
wherein each mounting extension fits over a first frame mounting point, each plate behind the latching mechanism fits over a second frame mounting point, and each mounting insertion piece fits into a third frame mounting point;
wherein the external frame further comprises a luggage rack;
wherein the luggage rack is located on top of the fender; and
wherein a tour pack can be attached to the luggage rack.

5. The touring motorcycle modification kit of claim 4, further comprising a sissy bar, wherein the sissy bar is attached to the front end of the luggage rack and extends vertically from the luggage rack.

6. The touring motorcycle modification kit of claim 4, wherein the kit can be used with a factory seat, exhaust system, wiring harness, saddle bags and tour pack.

7. A touring motorcycle modification kit comprising:
(a) an internal frame;
(b) an external frame;
(c) a fender; and
(d) two strut covers;
wherein the fender is situated between the internal and external frames;
wherein the internal frame is situated inside of the fender;
wherein the internal frame comprises two portions, and wherein the two portions are bolted together;
wherein the external frame is mounted on the motorcycle at three frame mounting points;
wherein two of the three frame mounting points are located on the exterior of the fender;
wherein none of the three frame mounting points is located inside of the fender;
wherein the external frame does not bolt to the frame mounting points but is releasably attached to the three frame mounting points;
and wherein no tools are required to install or remove the external frame;
wherein each strut cover comprises an indentation;
wherein a frame mounting point is located in the indentation in each strut cover; and
wherein the frame mounting point is a combination shock absorber bolt and frame mounting point.

* * * * *